(12) United States Patent
Barberis et al.

(10) Patent No.: US 10,685,150 B2
(45) Date of Patent: Jun. 16, 2020

(54) SYSTEM FOR DESIGN AND EXECUTION OF NUMERICAL EXPERIMENTS ON A COMPOSITE SIMULATION MODEL

(71) Applicant: INTERNATIONAL BUSINESS MACHINES CORPORATION, Armonk, NY (US)

(72) Inventors: Nicole C Barberis, Laramie, WY (US); Peter J Haas, San Jose, CA (US); Paul P Maglio, Catheys Valley, CA (US); Piyaphol Phoungphol, Atlanta, GA (US); Patricia G Selinger, Los Banos, CA (US); Wang-Chiew Tan, San Jose, CA (US); Ignacio G Terrizzano, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 649 days.

(21) Appl. No.: 14/042,615

(22) Filed: Sep. 30, 2013

(65) Prior Publication Data
US 2015/0094996 A1 Apr. 2, 2015

(51) Int. Cl.
*G06G 7/48* (2006.01)
*G06F 30/20* (2020.01)
*G06F 111/10* (2020.01)

(52) U.S. Cl.
CPC .......... *G06F 30/20* (2020.01); *G06F 2111/10* (2020.01)

(58) Field of Classification Search
CPC .................... G06F 17/5009; G06F 2217/16
USPC ................................................ 703/6
See application file for complete search history.

(56) References Cited

U.S. PATENT DOCUMENTS

| | | | |
|---|---|---|---|
| 7,574,342 B2 | 8/2009 | Kundert | |
| 8,364,610 B2 | 1/2013 | Grichnik et al. | |
| 8,365,195 B2 | 1/2013 | Williamson | |
| 2004/0019618 A1* | 1/2004 | Oyama | G06F 17/5045 708/250 |
| 2006/0271920 A1* | 11/2006 | Abouelsaadat | G06F 9/4448 717/137 |
| 2010/0306254 A1 | 12/2010 | Williamson | |

(Continued)

OTHER PUBLICATIONS

Peter J. Haas, Paul P. Maglio, Patricia G. Selinger, Wang-Chiew Tan, "Data Is Dead . . . Without "What-If" Models" IBM Research, 2011. 22 pages.*

(Continued)

*Primary Examiner* — Dwin M Craig
(74) *Attorney, Agent, or Firm* — Cantor Colburn LLP; Daniel Johnson

(57) ABSTRACT

An experiment manager is discussed for the design and execution of numerical experiments in composite simulation models, such as those created using the Smarter Planet Platform for Analysis Simulation of Health (Splash). The experiment manager independently elicits experiment-related information from each contributor of a component model, and uses this information to subsequently assist the creator of a composite model in selecting experimental factors, creating experimental designs based on these factors, and executing the experiments. This functionality permits cross-disciplinary modeling, simulation, sensitivity analysis and optimization in the setting of complex systems.

20 Claims, 14 Drawing Sheets

(56) References Cited

U.S. PATENT DOCUMENTS

2011/0320184 A1* 12/2011 Beyer ............... G05B 17/02
703/22
2013/0103369 A1 4/2013 Huynh et al.

OTHER PUBLICATIONS

Peter J. Haas, Paul P. Maglio, Patricia G. Selinger, Wang-Chiew Tan, "Data is Dead . . . Without "What-If" Models" IBM Research, Almaden & UC Santa Cruz, The 37th International Conference on Very Large Data Bases, Aug. 29-Sep. 3, 2011 2011, pp. 1486-1489.*

Peter J. Hass, Yannis Sismanis "On Aligninig Time-Series Data in Splash" BigData 2012 Istambul Turkey, 10 pages.*

Wang-Chiew Tan, Peter J. Haas, Ronald L. Mak Cheryl A. Kieliszewski, Patricia G. Selinger, Paul P. Maglio, Susanne Glissman, Melissa Cefkin, Yinan Li, "Splash: A Platform for Analysis and Simulation of Health" IHI Research Jan. 28-30, 2012, Miami Florida, ACM 978-1-4503-0781-9/12/01. 10 pages.*

Stephan Mertens, "Random Number Generators: A Survival Guide for Large Scale Simulations", Lecture given at the International Summer School Modern Computational Science (Aug. 16-28, 2009, Oldenburg, Germany) pp. 1-18.*

Hetherington et al., A Composite Computational Model of Liver Glucose Homeostasis. I. Building the Composite Model, Journal of the Royal Society Interface, Apr. 2012, 9(69), pp. 689-700.

Pasupathy et al., SimOpt: A Library of Simulation Optimization Problems, Proc of the 2011 Winter Simulation Conf, 2011, IEEE, pp. 4075-4085.

Sarjoughian, Model Composability, Proc of the 38th Winter Simulation Conf, 2006, pp. 149-158.

Phan et al., A Two-Stage Non-Linear Program for Optimal Electrical Grid Power Balance Under Uncertainty, Proc of the 2011 Winter Simulation Conf, 2011, IEEE, pp. 4227-4238.

Hu et al., Robust Simulation of Environmental Policies Using the DICE Model, Proc of the 2010 Winter Simulation Conf, 2010, IEEE, pp. 1295-1305.

For the Public's Health: The Role of Measurement in Action and Accountability, The National Academies Press, Dec. 2010, 204pgs.

Huang et al., A Systems-Oriented Multilevel Framework for Addressing Obesity in the 21st Century, Preventing Chronic Disease, Jul. 2009, 6(3), 10pgs.

Tan et al., Splash: A Platform for Analysis and Simulation of Health, Proc of the 2nd ACM SIGHIT, 2012, pp. 543-552.

Borner, Plug-And-Play Macroscopes, Communications of the ACM, Mar. 2011, 54(3), pp. 60-69.

Ford et al., An Extensible Spatial and Temporal Epidemiological Modelling System, Int'l Journal of Health Geographics, Jan. 2006, 5(4), 6pgs.

Collins et al., The Community Climate System Model Version 3 (CCSM3), Journal of Climate, Jun. 2006, 19(11), pp. 2122-2143.

Gregersen et al., OpenMI: Open Modeling Interface, Journal of Hydroinformatics, 2007, 9(3), pp. 175-191.

Conway et al., The Conduct of an Effective Simulation Study, INFORMS Transaction on Education, 3(3), pp. 13-22.

Davis et al., Improving the Composability of Department of Defense Models and Simulation, Rand Corporation, 2003.

Matejcik et al., Two-Stage Multiple Comparisons with the Best for Computer Simulation, Operations Research, 1995, 43(4), pp. 633-640.

Allen, Introduction to Discrete Event Simulation and Agent-Based Modeling, Springer, 2011.

Park et al., Multi-Level Simulations of Health Delivery Systems: A Prospective Tool for Policy, Strategy, Planning and Management, Service Science, Sep. 2012, 4(3), pp. 253-268.

Haas et al., Clio Grows Up: From Research Prototype to Industrial Tool, Proc of the 2005 ACM SIGMOD, 2005, pp. 805-810.

Haas et al., On Aligning Massive Time-Series Data in Splash, Big Data 2012, 2012, 10pgs.

Sacks et al., Design and Analysis of Computer Experiments, Statistical Science, 1989, 4(4), pp. 409-423.

Panneton et al., Improved Long-Period Generators Based on Linear Recurrences Modulo 2, ACM TOMS, 2006, 32(1), pp. 1-16.

Rinott et al., On Two-Stage Selection Procedures and Related Probability-Inequalities, Communications Statistics—Theory and Methods, 1978, 7(8), pp. 799-811.

Bethwaite et al., Mixing Grids and Clouds: High-Throughput Science Using the Nimrod Tool Family, Cloud Computing, Springer London, 2010, pp. 219-237.

Sanchez et al., Better Than a Petaflop: The Power of Efficient Experiment Design, Proc of the 2011 Winter Simulation Conf., 2011, IEEE, pp. 1441-1455.

Xu et al., E=MC3: Managing Uncertain Enterprise Data in a Cluster-Computing Environment, Proc of the 2009 ACM SIGMOD, 2009, pp. 441-454.

JAQL: Query Language for JavaScript Object Notation (JSON), http://code.google.com/p/jaql, 1 pg.

Kepler Scientific Workflow System, http://kepler-project.org/, 1 pg.

* cited by examiner

FIG. 8

Algorithm 1 Rinott Selection Procedure with MCB

Require: $k, n_0, C, \delta$

1: for $i = 1$ to $k$ do
2:     Simulate $S_i$ to obtain $Y_{i,1}, Y_{i,2}, \ldots, Y_{i,n_0}$
3:     $\bar{X}_i \leftarrow (1/n_0) \sum_{j=1}^{n_0} Y_{i,j}$
4:     $V_i \leftarrow (1/(n_0-1))(\sum_{j=1}^{n_0}(Y_{i,j} - \bar{X}_i)^2$
5:     $N_i \leftarrow \max\left(n_0, \left\lceil \frac{h^2 V_i}{\delta^2} \right\rceil\right)$
6:     Simulate $S_i$ to obtain $Y_{i,n_0+1}, Y_{i,n_0+2}, \ldots, Y_{i,N_i}$
7:     $\bar{Y}_i \leftarrow (1/N_i) \sum_{j=1}^{N_i} Y_{i,j}$
8: end for
9: Select system with largest value of $\bar{Y}_i$ as the best
10: for $i = 1$ to $k$ do
11:     Form confidence interval $[a_i, b_i]$ for $\gamma_i$, where
        $a_i = \min(0, \bar{Y}_i - \max_{j \neq i} \bar{Y}_j - \delta)$
        $b_i = \max(0, \bar{Y}_i - \max_{j \neq i} \bar{Y}_j + \delta)$
12: end for

FIG. 9

SYSTEM FOR DESIGN AND EXECUTION OF NUMERICAL EXPERIMENTS ON A COMPOSITE SIMULATION MODEL

BACKGROUND OF THE INVENTION

Field of Invention

The present invention relates generally to the field of simulation modeling and analysis. More specifically, the present invention is related to a system and method for design and execution of numerical experiments on a composite simulation model.

Discussion of Related Art

Decision-makers increasingly need to bring together multiple models across a broad range of disciplines to guide investment and policy decisions around highly complex issues such as population health and safety. Simulation-based optimization is a powerful and increasingly popular approach to the design and operation of highly complex systems over a wide variety of domains. For instance, the current list of test problems in the SimOpt.org library (see paper to R. Pasupathy et al. entitled "SIMOPT: A Library of Simulation Optimization Problems," in *Proc. Winter Simul. Conf,* 2011, pp. 4080-4090) includes applications to vehicle routing, supply chains, healthcare facilities, fisheries management, finance, call centers, voting machines, air transportation networks, and more. Other recent application domains have included electrical grids (see paper to D. Phan et al. entitled "A Two-Stage Non-Linear Program for Optimal Electrical Grid Power Balance Under Uncertainty," in *Proc. Winter Simul. Conf,* 2011, pp. 4227-4238) and environmental policymaking (see paper to Z. Hu et al. entitled "Robust Simulation of Environmental Policies Using the DICE Model," in *Proc. Winter Simul. Conf.,* 2010, pp. 1295-1305). Methodology for simulation optimization has developed along with applications; see, e.g., Chapters 17-21 in the book to S. G. Henderson et al. Eds., *Simulation,* ser. Handbooks in Operation Research and Management Science. Amsterdam, The Netherlands: Elsevier, 2006, vol. 13.

Currently, simulation optimization algorithms are typically applied to individual, domain-specific simulation models to solve relatively contained optimization problems. Simulation is increasingly being used, however, to guide investment and policy decisions around highly complex issues such as population health and safety (see publication by the Institute of Medicine entitled *For the Public's Health: The Role of Measurement in Action and Accountability*. The National Academies Press, 2010). In this setting, decision makers increasingly need to bring together multiple models across a broad range of disciplines. Such model composition is required to capture the behavior of complex "systems of systems" and gain synergistic understanding of highly complicated problems, avoiding unintended consequences of policy, investment, and operational decisions; see, e.g., the paper to H. Godfray et al. entitled "Linking Policy on Climate and Food," Science, vol. 331, no. 6020, pp. 1013-1014, 2011, and the paper to T. T. Huang et al. entitled "A Systems-Oriented Multilevel Framework for Addressing Obesity in the $21^{st}$ Century," *Preventing Chronic Disease,* vol. 6, no. 3, 2009, in the setting of food, climate, and health. This composition task is extremely hard because domain experts have different worldviews, use different vocabularies, sit in different organizations, and have often invested considerable effort in developing and implementing their models using different programming paradigms and development platforms.

Such prior art systems, however, fail to address how such disparate simulation models may be combined, and what the implications would be for simulation-optimization methodology.

SUMMARY OF THE INVENTION

In one embodiment, the present invention provides a non-transitory, computer accessible, memory medium storing program instructions for specifying and executing numerical experiments on a composite simulation model, wherein the program instructions are executable by a processor to implement: a first interface for independently eliciting, from each of a set of contributors of component models, information comprising: a recommended set of model parameters to use as experimental factors and optional recommended levels for each recommended experimental factor, all of which incorporate the model contributor's expertise, and, when a given component model includes a pseudo-random number generator, a specification for each component model's pseudo-random number generator, the specification comprising pseudo-random number generator name, a method by which initial seed value is passed to the pseudo-random number generator, and the initial seed value when explicitly specified for the pseudo-random number generator; a second interface that combines the individual recommendations for one or more component models into a coherent global recommendation for a dynamically created composite model comprising the one or more component models; and a third interface for outputting the dynamically created composite model.

In an extended embodiment, the above medium further comprises program instructions that are executed by the processor to implement: a fourth interface for designing a numerical experiment by using the global recommendation to specify a set of experimental conditions for the composite model, along with a number of Monte Carlo replications to use for each experimental condition; and an execution component that executes the numerical experiment by running the composite model one or more times, where such running includes the steps of routing appropriate parameter values to each component model and assigning seeds to random number generators in each composite model to avoid unintended statistical dependencies between component models.

In another embodiment, the present invention provides a non-transitory, computer accessible, memory medium storing program instructions for specifying and executing numerical experiments on a composite simulation model, wherein the program instructions are executable by a processor to implement: a first interface for independently eliciting, from each of a set of contributors of component models, information comprising: a recommended set of model parameters to use as experimental factors and optional recommended levels for each recommended experimental factor, all of which incorporate the model contributor's expertise, and, when a given component model includes a pseudo-random number generator, a specification for each component model's pseudo-random number generator, the specification comprising pseudo-random number generator name, a method by which initial seed value is passed to the pseudo-random number generator, and the initial seed value when explicitly specified for the pseudo-random number generator; a second interface that combines the individual recommendations for one or more component models into a coherent global recommendation for a dynamically created composite model comprising the one or more component models; a third interface for designing a numerical experiment by using the global recommendation to specify a set of experimental conditions for the composite model, along with a number of Monte Carlo replications to use for each experimental condition; and an execution component that executes the numerical experiment by running the composite model one or more times, where such running includes the steps of routing appropriate parameter values to each component model and assigning seeds to random number generators in each composite model to avoid unintended statistical dependencies between component models.

In yet another embodiment, the present invention provides a system comprising: a processor; and a storage storing program instructions for specifying and executing numerical experiments on a composite simulation model, wherein the program instructions are executable by the processor to implement: a first interface for independently eliciting, from each of a set of contributors of component models, information comprising: a recommended set of model parameters to use as experimental factors and optional recommended levels for each recommended experimental factor, all of which incorporate the model contributor's expertise, and, when a given component model includes a pseudo-random number generator, a specification for each component model's pseudo-random number generator, the specification comprising pseudo-random number generator name, a method by which initial seed value is passed to the pseudo-random number generator, and the initial seed value when explicitly specified for the pseudo-random number generator; a second interface that combines the individual recommendations for one or more component models into a coherent global recommendation for a dynamically created composite model comprising the one or more component models; and a third interface for outputting the dynamically created composite model.

In an extended embodiment, the above storage further stores program instructions that are executed by the processor to implement: a fourth interface for designing a numerical experiment by using the global recommendation to specify a set of experimental conditions for the composite model, along with a number of Monte Carlo replications to use for each experimental condition; and an execution component that executes the numerical experiment by running the composite model one or more times, where such running includes the steps of routing appropriate parameter values to each component model and assigning seeds to random number generators in each composite model to avoid unintended statistical dependencies between component models.

BRIEF DESCRIPTION OF THE DRAWINGS

The present disclosure, in accordance with one or more various examples, is described in detail with reference to the following figures. The drawings are provided for purposes of illustration only and merely depict examples of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

FIG. 8 illustrates a GUI for design of experiments.

FIG. 9 illustrates how the optimizer component of Splash uses the experiment manager to perform the Rinott procedure.

DESCRIPTION OF THE PREFERRED EMBODIMENTS

Figure 1:
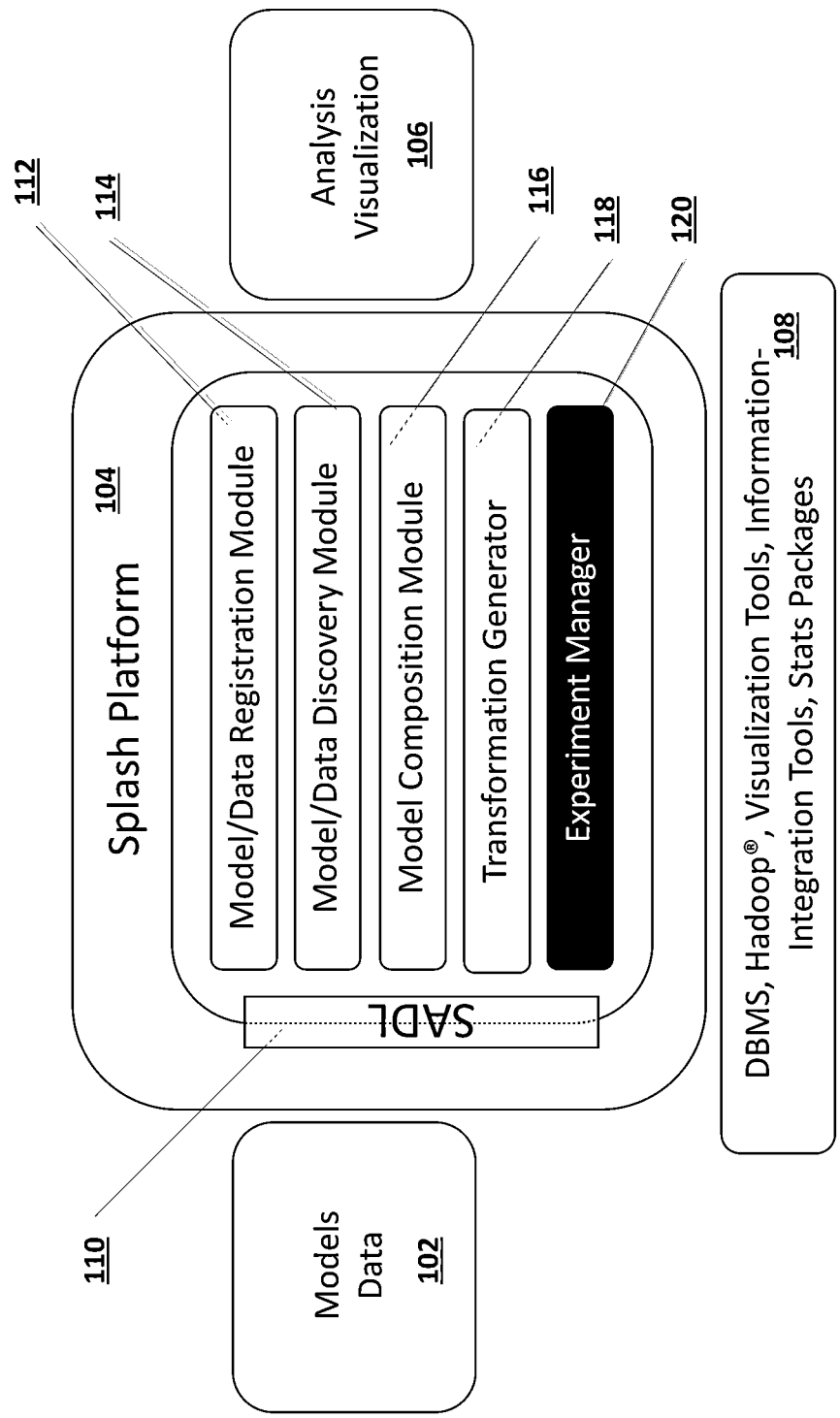
FIG. 1 depicts a system overview of the exemplary Splash platform for designing and executing composite simulation models.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein.

The use of the Smarter Planet Platform for Analysis Simulation of Health (Splash) is discussed for cross-disciplinary modeling, simulation, sensitivity analysis, and optimization in the setting of complex systems. Splash is a prototype system that allows combination of existing heterogeneous simulation models and datasets to create composite simulation models of complex systems. Splash, built on a combination of data-integration, workflow management, and simulation technologies, facilitates loose coupling of models via data exchange. The various components of Splash are described, with an emphasis on the experiment-management component, which is an embodiment of the present invention. This latter component uses user-supplied metadata about models and datasets to provide, via an interactive GUI, a unified view over all of the parameters in all of the component models that make up a composite model, a mechanism for selecting the factors to vary, and a means for allowing users to easily specify experimental designs for the selected factors. The experiment manager also provides a mechanism for systematically varying the inputs to the composite models. Also shown is how the experiment manager may be used to implement some simple stochastic-optimization functionality by implementing the Rinott procedure for selecting the best system. In addition, it is shown how a sensitivity-analysis method can be implemented using the experiment manager, based on a fractional-factorial experimental design. This technology is demonstrated via a composite model comprising a financial-rate model and a healthcare payer model.

An exemplary approach to enabling cross-disciplinary modeling and simulation is embodied in the Smarter Planet Platform for Analysis and Simulation of Health (Splash). Splash (see paper to W. C. Tan et al. entitled "Splash: a platform for Analysis and Simulation of Health," in *ACM Intl. Health Informatics Symp.* (*IHI*), 2012, pp. 543-552) is a prototype platform for combining existing heterogeneous simulation models and datasets to create composite simulation models of complex systems. To facilitate interdisciplinary collaboration and model re-use, Splash facilitates loose coupling of models via data exchange, building upon and extending existing data integration technology. The component models run asynchronously and communicate with each other by reading and writing datasets. Typically, data transformations between models are needed to ensure compatibility. Such transformations are designed semi-automatically in Splash: the modeler uses an intelligent GUI to specify a given transformation, and Splash then automatically compiles the specification into runtime code. The key ingredient for detecting incompatibilities and designing transformations, as well as for executing composite models, is user-supplied metadata about each component model and dataset. Splash shares some features with the CIShell open-source platform for software interoperability (see paper to K. Borner entitled "Plug-And-Play Macroscopes," *Commun. ACM*, vol. 54, no. 3, pp. 60-69, 2011), but is specifically tailored to simulation modeling and analysis, providing tools for semi-automated data transformation, time-series alignment, experiment management, and more, as discussed in what follows.

FIG. 1 depicts a system overview of the exemplary Splash platform 104 for designing and executing composite simulation models. Splash platform 104 comprises a Splash Actor Description Language (SADL) component 110 for specifying and maintaining metadata about each model and dataset contributed to Splash, model/data registration module 112 for eliciting SADL metadata from the contributor of a model or dataset (via SADL wizards) and creating a Splash model or data actor corresponding to the contributed model or dataset, model/data discovery module 114 for searching over the collection of models and datasets that have been registered with Splash, model composition module 116 that provides a design environment for creating composite simulation models and detecting mismatches between the data produced by one model and the data needed by another model, transformation generator 118 for semi-automatically designing and creating transformation code that corrects mismatches, and experiment manager 120, which is an embodiment of the present invention and elicits experiment-related information from model contributors and provides a facility for using this information to allow design and execution of experiments. Splash platform 104 receives as inputs contributed models and data 102 and provides analysis and visualization 106 of the results obtained by running the composite model. Splash platform has access to various tools/packages 108, e.g., DBMS tools, Hadoop®, visualization tools, information integration tools, statistics packages that may be used for storing and retrieving data, executing large-scale data transformations between models, visualizing model inputs and outputs, designing data transformations, and analyzing model results.

Figure 2:
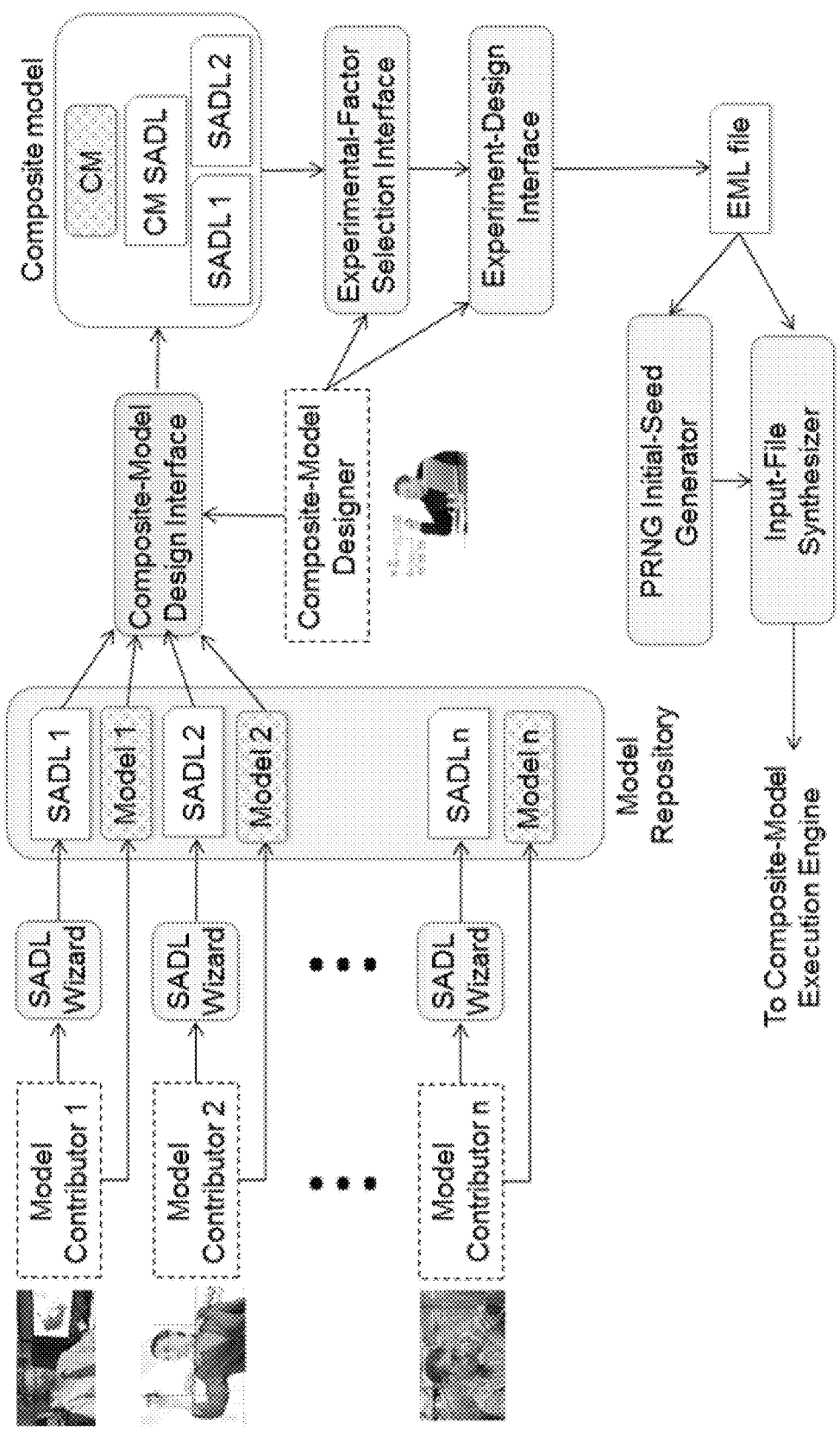
FIG. 2 depicts an overview of the functionality of the experiment manager.

FIG. 2 depicts a functional overview of the experiment manager, which is an embodiment of the present invention.

In FIG. 2, model contributors 1 through n are able to utilize a SADL wizard to input information regarding their component model, wherein the input information comprises: (1) a recommended set of model parameters to use as experimental factors, along with optional recommended levels for each recommended experimental factor, all of which incorporate the model contributor's expertise; and (2) a specification for each of the pseudo-random number generators used by the component model, such specification including the name of the pseudo-random number generator, the method by which the initial seed value is passed to the generator, and the initial seed value itself if explicitly specified for the generator. Such input information is stored in the model repository. Next, the individual recommendations for one or more component models are combined into a coherent global recommendation for a dynamically created composite model comprising the one or more component models. A numerical experiment is designed by using the global recommendation to specify a set of experimental conditions for the composite model, along with a number of Monte Carlo replications to use for each condition. An execution engine executes the numerical experiment by running the composite simulation model one or more times, where such running includes the steps of routing the appropriate parameter values to each of the component models and assigning seeds to the random number generators in the composite model so as to avoid unintended statistical dependencies between component models.

As a simple example of the operation of the invention, the contributor of model $M_1$, a climate model, might recommend (via the first interface) that the Temperature (T) and Pressure (P) parameters of $M_1$ be used as experimental factors, with recommended low and high values of 35 and 95 degrees for Temperature, and 920 mb and 1050 mb for Pressure. The contributor of model $M_2$, an insect-borne disease model, might independently recommend that the InfectionRate (I) parameter of $M_2$ be used as an experimental factor with low and high values of 0.15 and 0.30. If these two models are combined into a composite model $M_3$, then the second interface would combine the foregoing individual recommendations into a global recommendation for the three parameters Temperature, Pressure, and InfectionRate. The user of $M_3$ might then use the third interface to design a numerical experiment comprising the three experimental conditions $C_1$ (T=35, P=985, I=0.15), $C_2$ (T=35, P=985, I=0.30), and $C_3$ (T=95, P=985, I=0.15), each corresponding to a different assignment of values to the three parameters of $M_3$. Furthermore, the user of $M_3$ might specify 20 Monte Carlo replications for $C_1$, 40 replications for $C_2$, and 10 replications for $C_3$. The execution component would then execute $M_3$ a total of 70 times, ensuring that the parameters are set to their specified values prior to each execution. Moreover, using information in the SADL files for $M_1$ and $M_2$, the execution component will provide pseudorandom-number seeds to the pseudorandom number generators for each of $M_1$ and $M_2$ so as to avoid the situation where a sequence of pseudorandom numbers is used by both $M_1$ and $M_2$, thereby creating erroneous statistical dependencies between the behavior of the two models.

Further functionality of components shown in FIGS. 1 and 2 will be described below. Although the experiment manager component of the Splash platform is used as a running example of the present invention in conjunction with a composite simulation model made up of component stochastic simulation models, those skilled in the art will appreciate that the present invention can be used when one or more of the component simulations is deterministic, so that only a single Monte Carlo replication is needed and no pseudorandom number generator is used, and that a "component model" can in fact be any piece of analytical software that reads input data from a source and writes output data to a sink.

The design philosophy underlying Splash, inspired by recent developments in information management, contrasts with more traditional approaches. These include (1) writing a single monolithic model, (2) creating component models that are then compiled together (see, e.g., the paper to D. A. Ford et al. entitled "An Extensible Spatial and Temporal Epidemiological Modelling System," *Int. J. Health Geographics*, vol. 5, no. 4, 2006, and the paper to W. D. Collins et al. entitled "The Community Climate System Model Version 3 (CCSM3)," *J. Climate*, vol. 19, pp. 2122-2143, 2006), (3) adopting common standards and interfaces such as DEVS (see publication to G. A. Wainer entitled *Discrete-Event Modeling and Simulation: A Practitioner's Approach*, CRC Press, 2009) or OpenMI (see paper to J. Gregersen et al. entitled "OpenMI: Open Modeling Interface," *Journal of Hydroinformatics*, vol 9, no. 3, pp. 175-191, 2007), or (4) deploying distributed-simulation frameworks such as the High Level Architecture (see publication to F. Kuhl et al. entitled *Creating Computer Simulation Systems: An Introduction to the High Level Architecture*, New Jersey: Prentice Hall, 1999). In the latter approach, custom communication logic is added to pre-existing models, which are then run in a tightly synchronized manner based on the exchange of time-stamped events. All of these existing approaches have drawbacks that hinder cross-disciplinary collaboration. Monolithic models can be difficult and expensive to build, verify, validate, and maintain—see, e.g., the paper to R. W. Conway et al. entitled "The Conduct of an Effective Simulation Study," *INFORMS Trans. Education*, vol 3, no. 3, pp. 13-22, 2003, or pp. 4-6 of the publication to P. K. Davis et al. entitled *Improving the Composability of Department of Defense Models and Simulation*, Santa Monica, Calif.: RAND Corporation, 2003—and require fine grained collaboration across disciplines and organizations. Both traditional component modeling and distributed simulation approaches typically require extensive re-coding of existing models, as well as unrealistic requirements with respect to use of common standards across heterogeneous scientific and engineering disciplines; see the paper to W. C. Tan et al. entitled "Splash: A Platform for Analysis and Simulation of Health," in *ACM Intl. Health Informatics Symp. (IHI)*, 2012, pp. 543-552, for further discussion. Splash attempts to overcome these barriers by combining and extending information-integration, workflow-management, and simulation technologies.

In Section I, the key elements of Splash that enable the design and execution of a composite simulation model are described. This discussion both summarizes and updates the description of the Splash platform given in the paper to W. C. Tan et al. entitled "Splash: A Platform for Analysis and Simulation of Health," in *ACM Intl. Health Informatics Symp. (IHI)*, 2012, pp. 543-552. Section II describes Splash's experiment-manager component, an embodiment of the present invention, which allows systematic execution of a composite model over different sets of experimental parameters specified by the user. This component requires extensions to the original metadata language, and provides a GUI that consolidates the entire set of model parameters and permits design of experiments. Experiments designed in the GUI can be described using an "experiment markup language" (EML) and saved for future re-use or modification. Next, the experiment manager (see Experiment Manager 120 of FIG. 1) and the EML language may be used to implement some simple stochastic-optimization and sensitivity-analysis functionality. Specifically, Section III teaches an optimization component that allows Splash to select the best value for a control variable from among a small set of feasible values, using the Rinott selection procedure (see paper to Y. Rinott entitled "On Two-Stage Selection Procedures and Related Probability-Inequalities," *Commun. Statist. Theon. Meth.*, vol. A7, pp. 799-811, 1978), as enhanced by Nelson and Matejic (see paper to F. J. Matejcik et al. entitled "Two-Stage Multiple Comparisons with the Best for Computer Simulation," *Oper. Res.*, vol 43, no. 4, pp. 633-640, 1995). Section IV teaches the implementation of main-effects analysis capability, based on an underlying two-level fractional-factorial design; see, for example, pp. 70-73 of the textbook of T. T. Allen entitled *Introduction to Discrete Event Simulation and Agent-Based Modeling*, Springer, 2011. In Section V, this technology is applied to a small composite model comprising a simple financial-rate model together with a healthcare payer model based on the paper to H. Park et al. entitled "Multi-Level Simulations of Health Delivery Systems: A Prospective Tool for Policy, Strategy, Planning and Management," *Service Science*, 2012.

I. Composite Modeling with Splash

In Splash, domain experts contribute, and use, component simulation models and data sources. (Statistical models and optimization models can also be handled by the system.) Contributors register their models and data sources in the Splash repository. A designer of a composite model can then discover these components, connect them together, set up and run simulation experiments, and subsequently analyze, visualize, and share the results. The new composite model, as well as any useful datasets generated during the simulation experiments, can be registered in the repository and thus be made available to other model designers. In this section, the design process for a composite model and how a single simulation run is executed is described.

A. Registration of Models and Datasets

Models and data must be registered (via Model/Data Registration Module 112 of FIG. 1) with Splash before they can be used, to create Splash model actors and Splash data actors. These "actors" are components of Splash that encapsulate the framework's knowledge about the various models and data sources. This knowledge is specified via metadata files, written in the Splash Actor Description Language (SADL), that are created by the system as part of the registration process.

Figure 3:
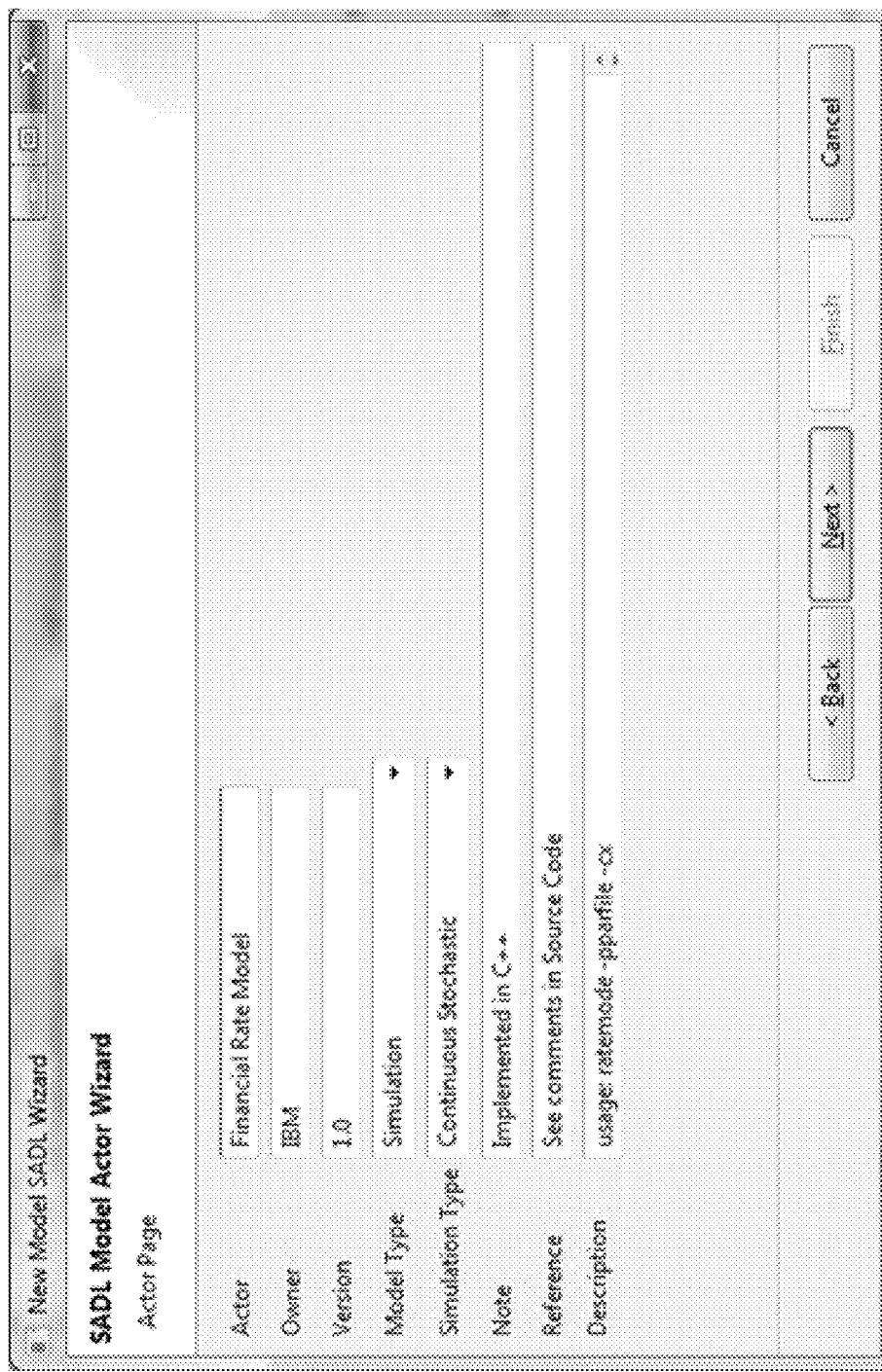
FIG. 3 illustrates a SADL wizard screenshot.

The SADL file for a model actor is created via a SADL "wizard" (via SADL Module 110 of FIG. 1), and contains pointers to the SADL files for the model's input data sources and the output datasets; each of these data sources and sinks is represented as a Splash data actor. The model SADL file also contains information on where and how the model is to be accessed and executed, as well as "provenance" data such as the model's owner, model type, the history of edits made to the SADL file, a summary description of the model's functionality, and pointers to references—such as scientific papers, URLs, and reviews—about the interpretation, assumptions, applicability, and quality of the model; see FIG. 3. FIG. 3 illustrates a SADL wizard screenshot and the following is a snippet of the resulting SADL code:

```
<actor name="Financial Rate Model"
actor_type="model"
model_type="Simulation"
```

-continued

```
simulation_type="Continuous stochastic"
owner="IBM"
version="1.0"
note="Implemented in C++"
reference="See comments in Source Code">
<description>
usage: ratemod -pparfile -cx
</description>
...
```

As can be seen from the code-above, the description language uses an XML-style syntax.

The SADL file for a data actor specifies information such as the data schema, data-source location, commands to access the data, and so on. A schema may be specified in industry-standard XSD format (a dialect of XML). The SADL file also describes important characteristics of each attribute (i.e., field) in the data-source records, such as measurement units, a description of the semantics of the attribute, general constraints on the data—e.g., weight must lie between 0 and 400 pounds and pre-tax income must exceed after-tax income. Such information is crucial for sensible composition of models (via Model Composition Module 116 of FIG. 1), as well as automated error checking and problem detection. SADL files for certain data sources, such as those containing time series data, have additional metadata, for instance, documenting that a time series comprises regular observations in continuous time with one tick equal to 15 minutes. Similarly, the SADL file may contain geospatial metadata. While the specification details a system that primarily handles data sources that correspond to files on disk, it should be noted that Splash is envisioned to handle other types of data sources, such as database management systems and data from web-service calls.

To create a composite model in Splash, a user searches through the repository (see Model/Data Discovery Module 114 of FIG. 1), retrieves and displays the "most relevant and compatible" models and data. The user then selects a particular subset of these models and data to combine.

B. Designing Composite Models

After identifying a suitable set of component models in the repository, a modeler then puts together these models in the Splash design environment. The current Splash prototype relies on the Kepler scientific workflow system (see paper entitled "Kepler Scientific Workflow System,") to provide a visual design environment. A user designs a composite model by dragging icons from the repository window and dropping them into the design workspace; these icons represent Splash data actors and model actors, as well as mapper actors that execute data transformations (via Transformation Generator 118 of FIG. 1). The user then connects the components and configures the mapper actors (as described below).

Figure 4:
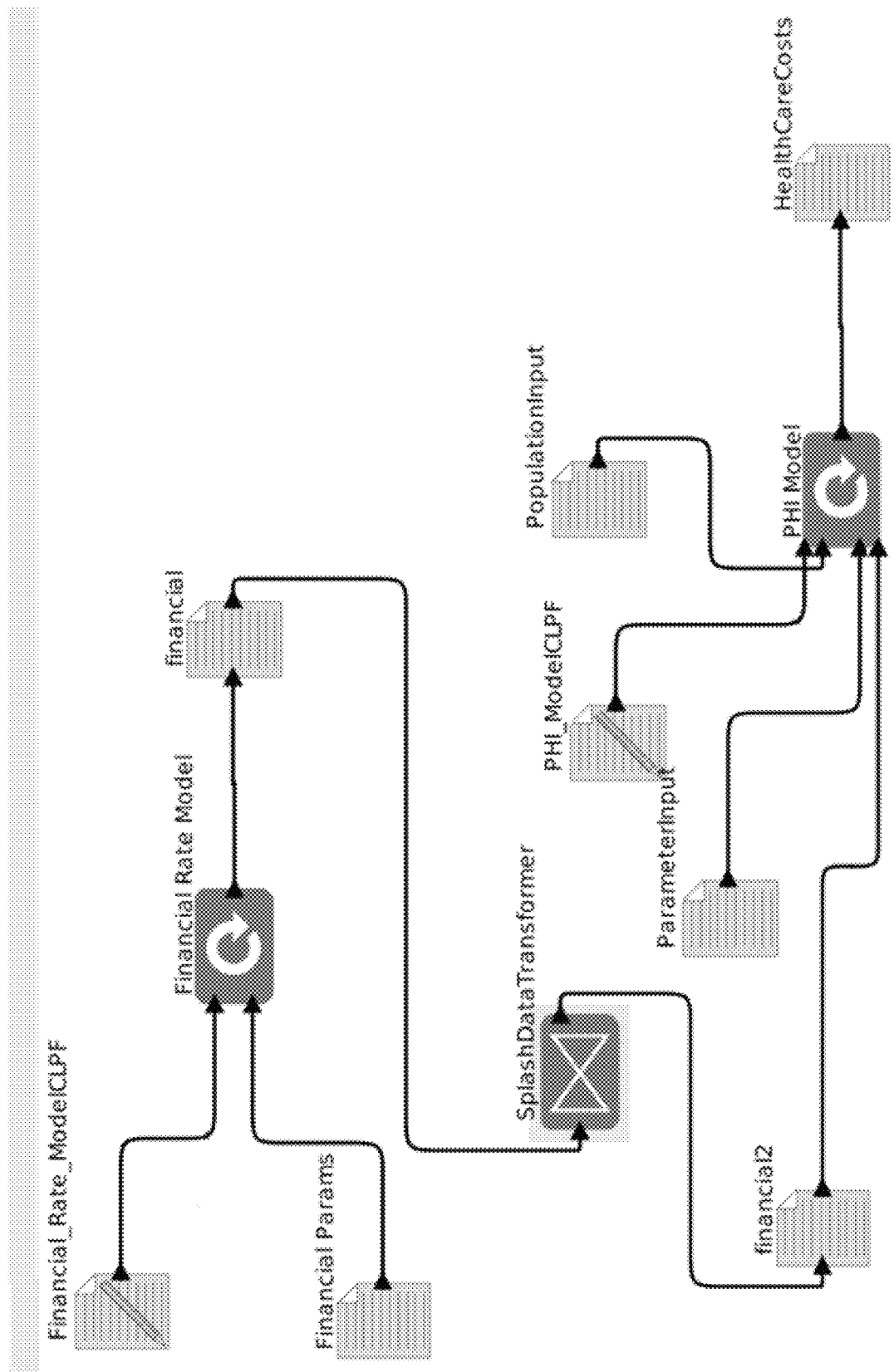
FIG. 4 illustrates a design environment showing a simple composite healthcare model.

FIG. 4 shows a screenshot of a simple composite model comprising two component models. The PHI (Predictive Health Institute) model is derived from an agent-based simulation model developed by H. Park et al. (see the paper to H. Park et al. entitled "Multi-Level Simulations of Health Delivery Systems: A Prospective Tool for Policy, Strategy, Planning and Management," *Service Science*, vol. 4, no. 3, September 2012, pp. 253-268) to explore the economic performance of a wellness program for managing heart disease and diabetes under alternative payment models (capitated—i.e., fixed—payments to the healthcare provider, outcome-based payments, or a combination of the two). The PHI model takes as input a time series of the annual healthcare inflation rate, general economic inflation rate, and discount rate (cost of capital). This time series is provided by the displayed financial-rate (FR) model, which is an extremely simple random-walk model used here for demonstration purposes. This composite FR-PHI model is used as a running example.

Figure 5:
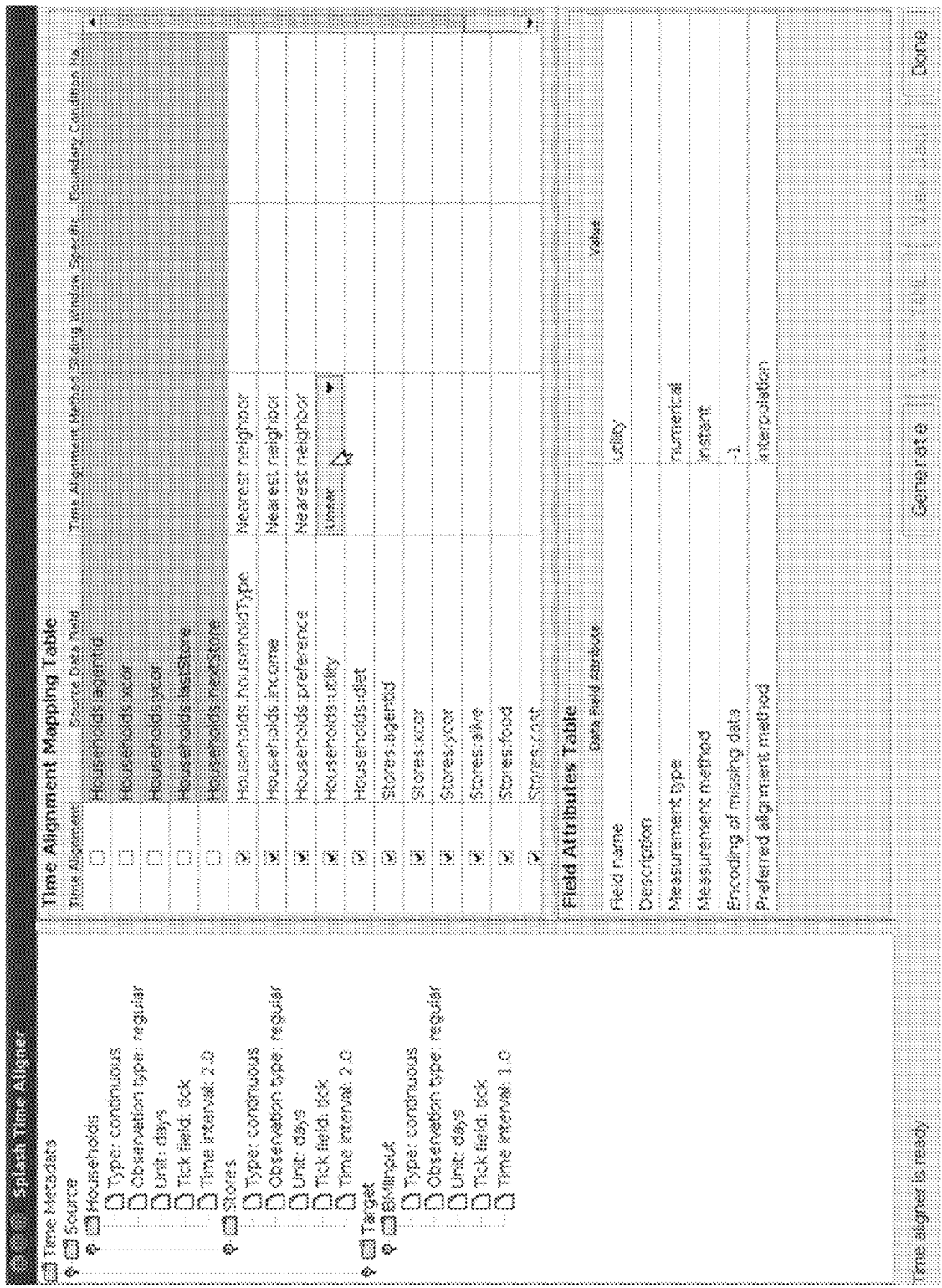
FIG. 5 illustrates a visual interface for designing time-alignment transformations.

The output dataset of the FR model is passed through a Splash mapper actor named SplashDataTransformer to create the corresponding input dataset of financial rates for the PHI model. In this very simple model, the mapper actor essentially copies the data unchanged. In general, however, output data produced by one or more upstream "source" models may need to be combined together and transformed (via Transformation Generator 118 of FIG. 1) in sophisticated ways to create input data for a downstream "target" model. Splash provides a number of tools to detect source/target mismatches and allow the semiautomatic creation of data transformations. In particular, if a source model outputs a time series which is then input to a target model, Splash will use the metadata in the SADL files for these models to automatically detect time mismatches—e.g., if the source model outputs data every second but the target model needs data every 0.5 seconds—and will pop up a visual interface (see FIG. 5) that allows the user to choose a time alignment method for each data field in the time series; in this case, a menu of interpolation methods such as linear, cubic-spline, or nearest-neighbor will be displayed. Depending on the relative time granularity of the source and target time series, as well as the type of data item to be imputed (an instantaneous measurement, cumulative amount since last tick, or cumulative amount since start of measurement period) the interface can also display a menu of appropriate aggregation or allocation transformations. Splash will also automatically glean from the SADL metadata the information needed to handle missing data, "boundary" data points at the beginning or end of a time series, and so on.

Figure 6:
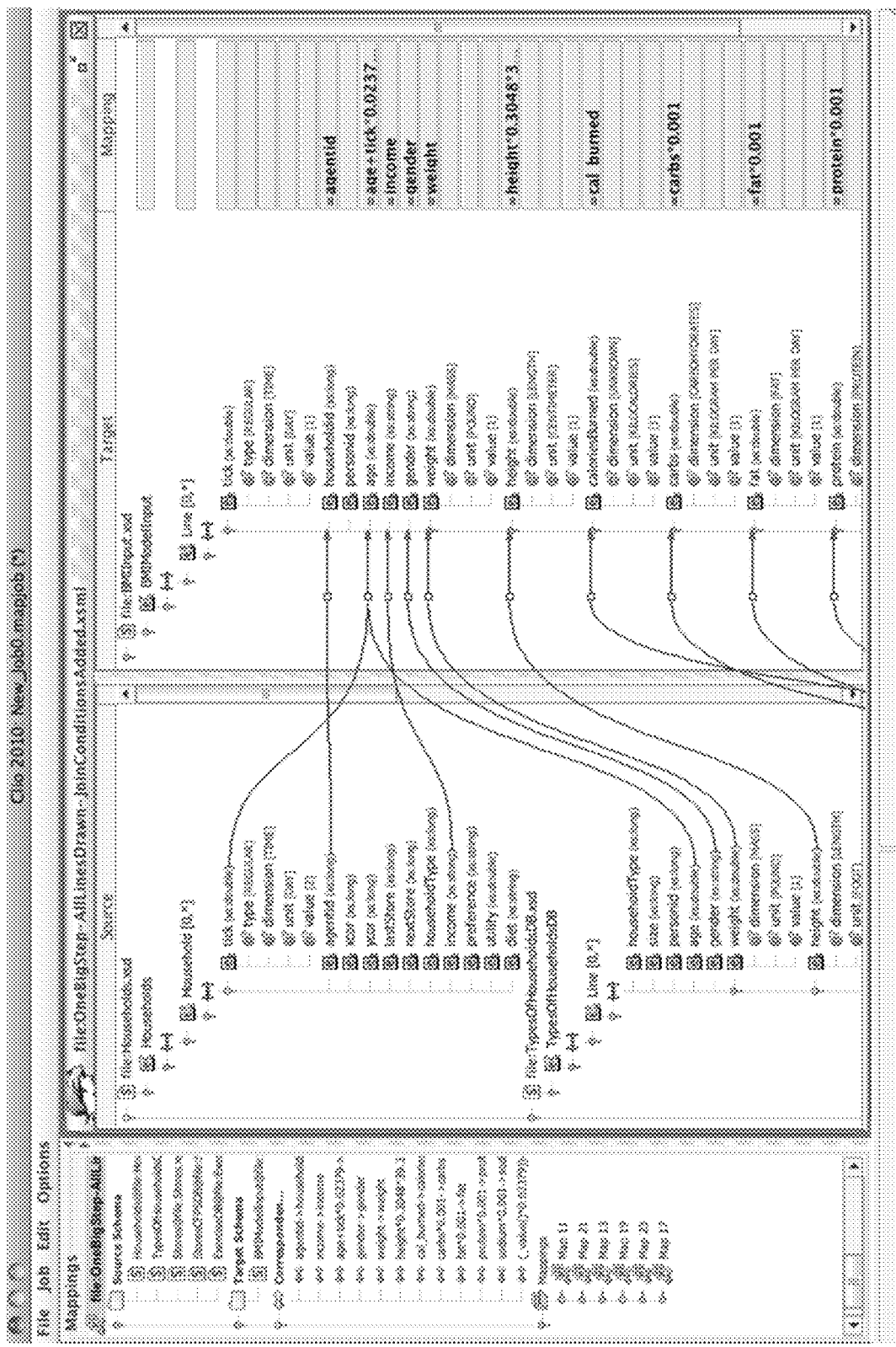
FIG. 6 illustrates a visual interface for designing structural data transformations.

In a similar manner, Splash provides a visual interface as in FIG. 6 for the interactive design of "structural" data transformations from multiple source schemas to an input schema. The interface is based on an extension of the Clio (see the paper to L. M. Haas et al. entitled "Clio Grows Up: From Research Prototype to Industrial Tool," in *SIGMOD Conference*, 2005, pp. 805-810) tool for design of schema mappings. The user draws a line from a source attribute to a target attribute to identify a correspondence between them. It is also envisioned that Splash may use schema-matching technologies to automatically suggest such correspondences. Various transformations can be specified to merge together one or more source attributes to create a target attribute, and the system will automatically add simple transformations such as measurement unit corrections (e.g., kilograms to pounds).

The data-transformation specifications from each of the foregoing design steps are saved in a file, using a specification language: XML schema mapping language (XSML) for structural mappings and a novel time alignment markup language (TAML) for time alignments. The transformations can later be reloaded into the GUIs for re-use or modification.

C. Code Generation and Execution of Composite Models

Once the user has finished designing a data transformation, the system automatically generates runtime code to execute the transformation during a simulation run. This step serves to instantiate a Splash mapper actor, which can be stored in the Splash repository. Because the execution of large, high-resolution models can generate enormous amounts of data, it is important to ensure that the transformations are carried out in a fast and scalable manner. Currently, Splash compiles a data transformation into JAQL (see publication entitled "JAQL: Query Language for JavaScript Object Notation (JSON)," 2009) code, which will execute the transformation on the Hadoop® platform for massive parallel MapReduce processing of data. See (see publication to Y. Li et al. entitled "Data Exchange Between Simulation Models: Getting the Time Right," IBM Research—Almaden, San Jose, Calif., Tech. Rep., 2012) for a detailed description of Splash's time-alignment framework and the paper to P. J. Haas et al. entitled "On Aligning Massive Time-Series Data in Splash," in *Intl. Workshop on End-to-end Management of Big Data* (*BigData* 2012), for a description of a novel MapReduce algorithm for cubic-spline interpolation in Splash, based on distributed stochastic gradient descent.

To perform an individual simulation run of a composite model, the current prototype uses Kepler's "director" mechanism to orchestrate the execution of the component Splash model actors and mapping actors. In the example of FIG. 4, the FR model executes first, followed by the Splash-DataTransformer mapper and then the PHI model. In general, it is possible to execute multiple groups of component models and mappers in parallel, if allowed by the structure of the composite model. Currently, Splash most easily handles composite models in which the data flow can be represented as a directed acyclic graph, so that there is always a clear notion of upstream and downstream models.

For this simple example, all models and data sources reside on the same computer as Splash. In general, Splash can execute models remotely. Indeed, upon invocation, a Splash model actor or mapping actor simply synthesizes an appropriate command-line string for executing the model or mapping code and sends it to an appropriate destination. This remote execution capability can be important if certain models must be executed on specialized hardware or executed behind a firewall for security or privacy reasons.

Two modes of model execution are envisioned. The first mode supports debugging and "test driving" a composite model, both when the model is first created and later on, if the model produces unusual or counterintuitive results that merit deeper investigation. For this type of execution, scientific-workflow functionality can be very valuable, in that it is easy to send copies of the intermediate data produced by component models to, say, a visualization actor for plotting or a statistical-analysis actor to run diagnostics or perform validation. (Kepler currently has native support for the R statistical package, for example.) The second type of execution comprises "production runs" where the model is executed under a range of different inputs and parameter values to study its behavior for purposes of calibration, validation, prediction, sensitivity analysis, and optimization. This latter mode of operation lies within the purview of the present invention, that is, experiment manager component (see Experiment Manager 120 of FIG. 1).

II. Experiment Management

The Splash experiment manager (see Experiment Manager 120 of FIG. 1) forms the foundation for sensitivity analysis and simulation optimization. Key challenges in this setting include (1) providing a unified view over all of the parameters in all of the component models that make up a composite model, (2) providing a mechanism for selecting the factors to vary, and (3) allowing users to easily specify experimental designs for the selected factors. An additional challenge is to provide a mechanism for systematically varying the inputs to the composite models; in general, each model will have been developed in isolation, with no view towards having the model as part of an ensemble. Splash's solutions to each of these issues are discussed in the following sections. As will be seen, extensions to the SADL metadata language play a crucial role in enabling experiment management. The goals of the experiment manager are similar to those of the script-based Nimrod toolset for computational experiments in a grid-computing environment (see paper to B. Bethwaite et al. entitled "Mixing Grids and Clouds: High-Throughput Science Using the Nimrod Tool Family," in *Cloud Computing: Principles, Systems and Applications*. Springer, 2010, pp. 219-237).

Standard experimental-design terminology is used throughout: an experiment comprises the systematic variation of a finite set of factors to study their effect on system behavior. The case where each factor can take on multiple values, or levels, is of particular interest. By fixing each factor at one of its levels, a specific experimental condition is obtained. Because composite models are often stochastic in nature, multiple Monte Carlo replications are run for each condition that is to be studied. The design specification for a simulation experiment then comprises a set of conditions to simulate, along with the number of replications for each condition. (The number of replications can vary from one condition to another.) One standard experimental design is the full-factorial design, in which every possible condition is simulated. For k factors with two levels each, for example, there are $2^k$ conditions, with multiple replications required for each condition. Typically, this design is too expensive and so the usual goal is to find a design with fewer conditions that will still capture the most important relationships between factor values and system behavior; see, e.g., the publication to J. P. C. Kleijnen entitled *Design and Analysis of Simulation Experiments*, Springer, 2008, the publication to J. Sacks et al. entitled "Design and Analysis of Computer Experiments," *Statist. Sci.*, vol. 4, no. 4, pp. 409-423, 1989, and the paper to S. M. Sanchez et al. entitled "Better Than a Petaflop: The Power of Efficient Experimental Design," in *Proc. Winter Simul. Conf,* 2011, pp. 1441-1455.

A. Specifying Factors

Splash data sources are divided into data files whose values remain constant over an experiment and parameter files having one or more model parameters that correspond to experimental factors, and hence are varied over the course of the experiment. Referring to FIG. 4, for example, the PopulationInput data source comprises a file that contains physical characteristics for each member of a simulated population (age at start of simulation, 10-year heart risk, and so on); this file is randomly sampled with replacement to produce new members of the simulation population when needed. In the experiments with the FR-PHI model that are described in Sections III and IV below, for example, the characteristics of a population remain fixed, and so PopulationInput is viewed as a data file. On the other hand, the data source ParameterInput contains PHI model parameters that will be varied from condition to condition—such as the population growth rate, capitation amount per patient, terminal age at which the patient exits the program, and payment model (the relative fraction of the capitation versus outcome-based components of the healthcare provider's revenue)—and thus ParameterInput is considered to be a parameter file. Note that the name of the population data file might be considered a parameter in some experiments if it is of interest, say, to compare results for a given urban population to those for a given rural population.

The SADL syntax is extended to let an attribute in the input data source for a model be flagged as a potential experimental factor. Consider, for example, the snippet from the file ParameterInput.sadl shown below:

```
<attribute name="terminalAge"
description="age at which person exits program"
measurement_type="numerical"
unit = year
datatype="double"
experiment_default_values="65 70 75"
experiment_factor="true"
/>
```

The parameter terminalAge is identified as a potential experimental factor, and the model provider has recommended default low, medium, and high level values for this parameter as 65, 70, and 75. A file is considered to be a parameter file if experiment_factor="true" for at least one attribute in the file (if a model parameter is supposed to stay constant throughout an experiment, then experiment_factor is set to "false" and a single experiment default value is specified). In addition to being read from a file on disk, the other way in which parameters are routed to a component simulation model is via arguments given on the command line when invoking the model. For instance, the PHI model is invoked as

```
> PHI -o /default_dir/populationdata.csv \
-p /default_dir/data/params.csv -r 132453 ...
``` where the command-line parameters include the name of the population characteristics file to use, the name of a file of additional parameter values to read, and a seed for the pseudorandom number generator used by the model.

In Splash, such data are conceptually viewed as being read from a "command-line parameter file" PHI_Mode1CLPF.csv containing the data values, i.e., the two filename strings, the integer pseudorandom number seed, and so on. This data source is encapsulated as a Splash data actor and described by a file PHI_Mode1CLPF.sadl that gives the data type, units, description, and so on, for each of the command-line parameters. See FIG. 4, in which each model has a CLPF data source, and the following snippet of the SADL file for the PHI model CLPF:

```
<attributes>
<attribute
name="population"
description="population data file input to PHI_Model"
datatype="string"
experiment_factor="true"
experiment_default_values="/default_dir/populationdata.csv"
label="-o"
/>
<attribute
name="parameters"
description="pathname for file containing parameter data"
datatype="string"
experiment_factor="false"
experiment_default_values="/default_dir/data/params.csv"
label="-p"
/>
<attribute
name="rseed"
description="Pseudorandom number seed for PHI Model"
datatype="integer"
experiment_default_values="1234"
experiment_factor="false"
label="-r"
```

-continued

```
random_seed="true"
/>
</attributes>
```

In most respects, a CLPF file is treated just like any other parameter file.

B. Designing Experiments

Figure 7:
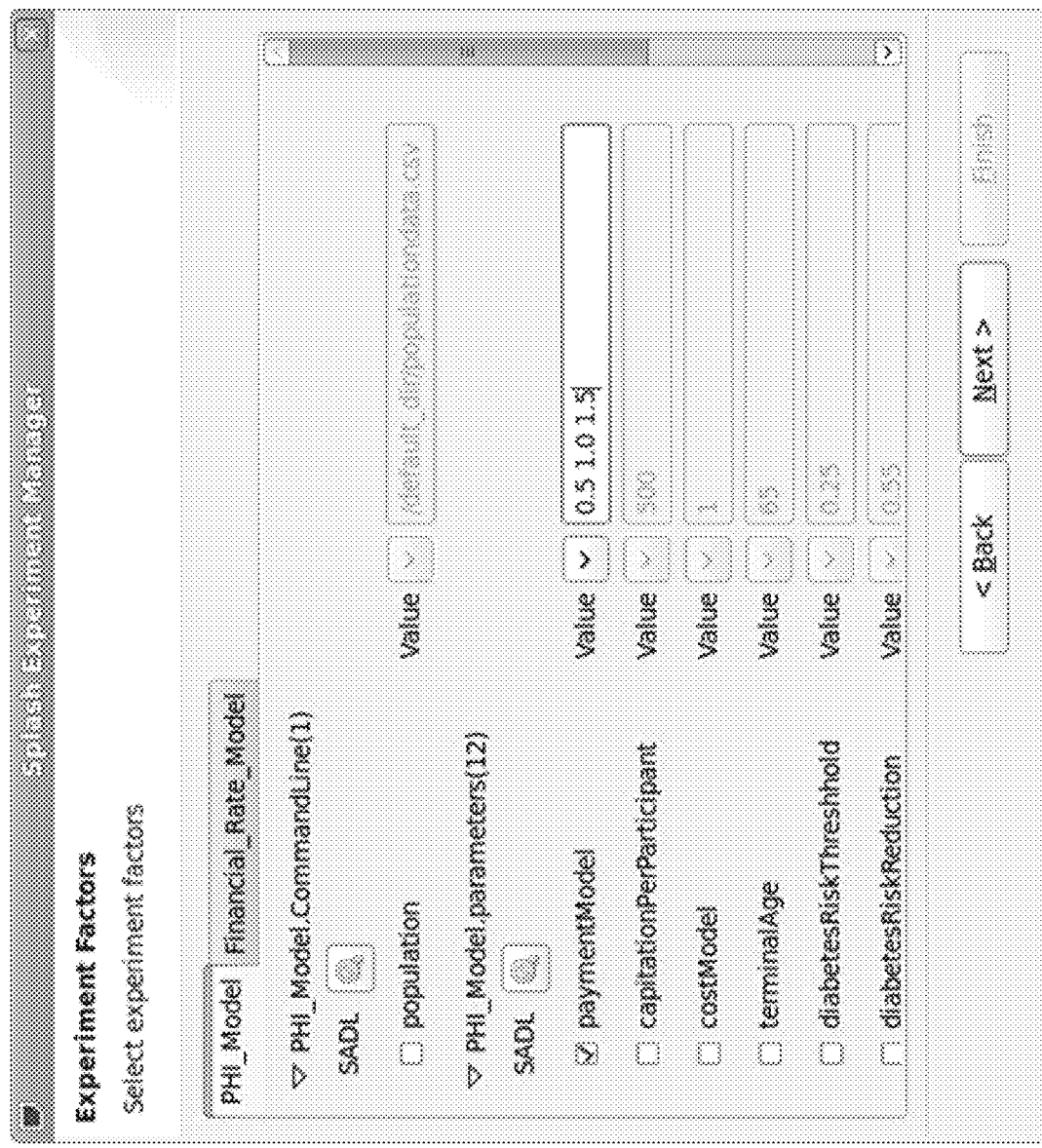
FIG. 7 illustrates a GUI for selecting experiment factors.

Experiments are designed using a GUI that brings together all of the potential experimental factors in a composite model. Specifically, the experiment manager (see Experiment Manager 120 of FIG. 1) first identifies the set of "base" parameter files in a composite model, that is, those parameter files whose contents are not derived from the output of any component model. In the composite model of FIG. 4, for example, the data sources FinancialParams and PHI_ModelCLPF correspond to base parameter files but financial2 does not. The GUI then systematically reads the SADL files corresponding to each of the base input parameter files, and displays all of the parameters in each file that have been flagged as potential experimental factors; see FIG. 7. As shown in the figure, the user then indicates which of the potential experimental factors should actually be treated as factors in the experiment of interest. Default levels for the selected factors are obtained from the SADL description, as discussed previously, and can be modified in the GUI.

Figure 8:
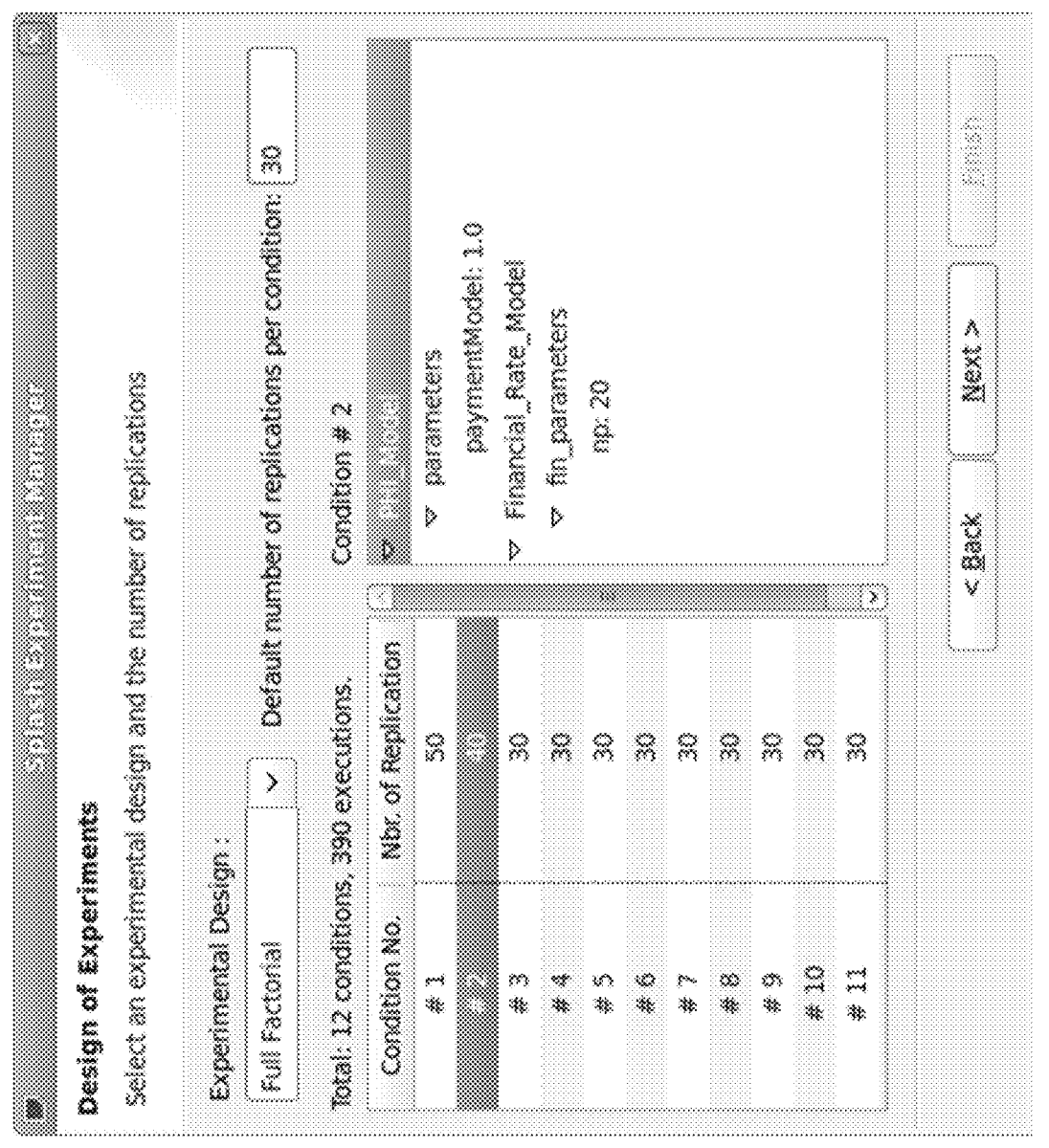

The user can then specify the experimental design, either by selecting a standard design from a drop-down menu, or by explicitly specifying the desired set of conditions. Similarly, the user can specify a fixed number of Monte Carlo replications to use for all of the conditions, or can specify a desired number of replications for each condition individually; see FIG. 8.

The experimental design specification is saved in a file, using an experiment markup language (EML). As with the markup languages for data transformations, the EML representation of an experiment can be loaded into the experiment manager (see Experiment Manager 120 of FIG. 1) at a later time for purposes of experiment modification or re-execution.

Snippets of an EML file are provided below, which specifies the composite model to run, the top-level directory for holding the simulation outputs, the set of factors and their levels, along with the specific level values and number of replications for each condition.

```
<eml model="FR-PHI" date="06/22/2012">
<archive>user/model/fin-phi/fin-phi.splash</archive>
<experiment-directory>/user/expts</experiment-directory>
<global-seed>1234</global-seed>
<experiment-factors>
<submodel name= "PHI_Model">
<datasource name="PHI_ModelCLPF">
<factor name="popdata">
<value>"popUrban.dat"</value>
<value>"popRural.dat"</value>
</factor>
</datasource>
<datasource name="ParameterInput">
<factor name="PaymentModel">
<value>0.0</value>
<value>0.5</value>
<value>1.0</value>
</factor>
<factor name="CapAmount">
<value>100</value>
<value>3000</value>
</factor>
</datasource>
```

```
        </submodel>
      </experiment-factors>
      <experiments>
        <condition no="1" replication="20">
          <factor name="PHI_ModelCLPF#popdata"
            value="popUrban.dat"/>
          <factor name="ParameterInput#PaymentModel"
            value="0"/>
          <factor name="ParameterInput#CapAmount" value="100"/>
        </condition>
        <condition no="2" replication="10">
          <factor name="PHI_ModelCLPF#popdata"
            value="popRural.dat"/>
          <factor name="PaymentModel" value="0.5"/>
          <factor name="CapAmount" value="100"/>
        </condition>
      </experiments>
    </eml>
```

Observe that, for the experiment described by the EML snippet, the entire population is treated as an experimental factor, with two levels corresponding to an urban and a rural population. The EML file also specifies a global pseudorandom number seed to use for the experiment; the issue of seed management is discussed in the next section.

C. Executing Experiments

For each simulation run in an experiment, the experiment manager (see Experiment Manager 120 of FIG. 1) must first prepare all of the data sources expected by the component models. The procedure for a given data source depends on how the data are "routed" to the model.

Perhaps the simplest data source to deal with is the set of command line arguments for a given component model. In this case, the experiment manager simply generates the appropriate invocation command for the model—as in the PHI example of Section II-A—which is then executed on the machine where the model resides. Any argument values that change from condition to condition are obtained from the EML file, and any other unchanging, default argument values are obtained from the SADL file corresponding to the model's CLPF. The CLPF SADL file also contains information needed to format each command line argument, such as the command line flag, if any. (If the interpretation of command-line parameters depends on the order of the parameters rather than explicit flags, then this order is captured in the CLPF SADL file.)

For a data source that corresponds to a file of parameter values, the experiment manager needs to synthesize a version of the file having the correct value for each parameter, and then put the file in a location where the model expects it. In addition to supporting standard file formats, the experiment manager handles non-standard formats using a template system similar to that in the paper to B. Bethwaite et al. entitled "Mixing Grids and Clouds: High-Throughput Science Using the Nimrod Tool Family," *Cloud Computing: Principles, Systems and Applications*, Springer, 2010, pp. 219-237. The idea is that a model developer can take a "typical" input parameter file and create a template by replacing every specific data value that may vary across experimental conditions with a symbol that identifies the parameter. For instance, the line
   TEMPERATURE=35.2 PRESSURE=120
would be replaced by
   TEMPERATURE=$$TEMP$$&&5.1f&&
   PRESSURE=$$PRESS$$&&4d&&
to identify the parameters TEMP and PRESS, along with the formatting details for each parameter. The template information can then be used to generate parameter files with varying values of temperature and pressure. The goal is to enable a fairly generic mechanism for dealing with a large class of idiosyncratic file formats without forcing model developers to write a separate wrapper for each such format. This mechanism can also be used to parse nonstandard output files from source models or generate nonstandard input files for target models as part of the data transformations that occur during a simulation run of a composite model.

Putting a synthesized parameter file in the correct location can be as simple as putting the file in some preferred directory and synthesizing an appropriate command-line argument that specifies the filepath. For example, params.csv, a parameter file for the PHI model, is placed in directory /default_dir/data/ and then a CLPF is created as before, which will in turn lead to the synthesis of an invocation command as in Section II-A. In a more difficult situation, the filepath might be hard-wired into the model's code. In this case, the expected filepath is specified in the model's SADL file, so that the experiment manager can create the appropriate directory, copy the synthesized parameter file to this directory, and rename the file as needed, prior to model execution. Data read from standard input can be handled in a similar manner.

The experiment manager has analogous capabilities for handling the output from simulation models. In general, the user specifies a top-level directory to hold the output files from a set of experiments, and Splash creates subdirectories for each (experiment, condition) pair. Each such subdirectory holds the output from the corresponding Monte Carlo replications. Output files with a hardwired destination may need to be copied from a model-specified directory to the user's preferred directory.

Next, a discussion is provided regarding one of the more challenging issues when running experiments over stochastic composite models, namely, dealing with the pseudorandom number generators (PRNGs) in the various component models. Most stochastic simulation models use PRNGs, which take as input an integer value called a seed and apply a deterministic recursion to generate sequences of seeds that appear to be statistically random; this sequence of seeds forms a cycle, since the generator will eventually return to its starting state. The potential problem is that two component models might inadvertently use sequences of seeds that overlap, which would induce spurious statistical correlations between the models.

The experiment manager currently handles PRNG seeding as follows. The SADL syntax for a component model allows specification of the PRNG(s) used by the model, and the mechanism by which the seed for the generator is set. In the easiest case, the initial seed is a parameter of the model that can be set by the experiment manager; see, for example, the PHI model invocation example in Section II-A, where the seed may be specified on the command line. The experiment manager allows specification of a global seed which is used by Splash to generate initial seeds for each replication of each component model. Provided that the PRNG for a component model is different from Splash's PRNG—currently the WELL19973a generator (see paper to F. Panneton et al. entitled "Improved Long-Period Generators Based on Linear Recurrences Modulo 2," *ACM Trans. Math. Software*, vol. 32, no. 1, pp. 1-16, 2006)—the initial seeds provided by Splash will map to locations on the component model PRNG cycle that will appear to be chosen at random. If the length of the latter cycle is sufficiently long, then the cycle segments "consumed" during different replications will be unlikely to overlap and the statistical performance should be acceptable. If the generators are the same, then initial seeds can be chosen to explicitly avoid overlap of seed subsequences; see the paper to F. Xu et al. entitled "E=MC³: Managing Uncertain Enterprise Data in a Cluster-Computing Environment," in *ACM SIGMOD*, 2009, pp. 441-454, for some pertinent techniques and analysis.

Some component models do not allow fine-grained control of seeds. For example, some models derive their initial seed from the system clock. Since both knowledge about and control over PRNGs may be limited, it is expected that diagnostics and statistical testing will play an important role in avoiding erroneous or misleading simulation results. For example, in the debugging mode of model execution mentioned in Section I-C, the user could run statistical tests of independence on pairs of model output sequences that are supposed to be independent according to the model definition, perhaps after batching the outputs.

III. Optimization

In this section, a discussion is provided on how the experiment manager functionality can be exploited to support rudimentary simulation-based optimization over a composite model. As discussed below, the current Splash prototype uses the R statistical package for the supporting statistical calculations and final graphical display of results.

The goal is to select the best value of a control variable from among a small number of feasible values. Here "best" means the value that maximizes an expected "reward" (typically revenue or profit). Specifically, the well-known Rinott two-stage selection procedure is implemented for choosing the best system under an indifference-zone relaxation (see paper to Y. Rinott entitled "On Two-Stage Selection Procedures and Related Probability-Inequalities," *Commun. Statist. Theon. Meth.*, vol. A7, pp. 799-811, 1978). In the current setting, each "system" corresponds to the composite model running under a fixed value of the control variable. Note that the control variable may actually correspond to a vector of model parameters, as long as the number of distinct parameter vectors considered is small. For example, one "control-variable value" might correspond to a capitation rate of $200 per program participant per year and a payment-model factor of 0.1, whereas another value might correspond to a capitation rate of $100 and a payment-model factor of 0.5. Although the discussion centers on the Rinott procedure, other optimization algorithms can be supported by the experiment manager.

The general setting for the Rinott procedure is a small collection of systems $S_1, S_2, \ldots, S_k$ (typically $k \leq 20$), where the expected reward of the system $S_i$ is an unknown constant $\mu_i$ that can only be estimated via stochastic simulation. That is, $\mu_i = E[Y_i]$, where $Y_i$ represents the noisy output from a single simulation run of $S_i$. The goal is to select the system having the largest expected reward, ensuring that the probability of correct selection exceeds a specified constant C; e.g., take C=0.95 to be 95% certain that the best system is selected. To make the computation tractable, it is assumed that any two systems having rewards within $\delta$ units of each other are considered equally acceptable, where the length of the "indifference zone" is specified by the user, based on practical considerations. Thus, a selection is considered "correct" if the expected reward for the selected system is greater than or equal to $\mu^* - \delta$, where $\mu^* = \max_{1 \leq i \leq k} \mu_i$ is the maximum expected reward; if the difference in expected reward between the two best systems is greater than $\delta$, then, with probability C, the best system will, in fact, have been selected. (Without an indifference zone, a huge number of Monte Carlo replications might be required to distinguish between two systems whose expected rewards are very close to each other.)

To allow additional inferences about the alternative systems, the algorithm also provides interval estimates for the set of quantities $\{\gamma_1, \gamma_2, \ldots, \gamma_k\}$, where $\gamma_i = \mu_i - \max_{j \neq i} \mu_j$. These quantities indicate the relative performance of the various systems. For example, suppose that k=3 systems are being compared and, unbeknown to us, $(\mu_1, \mu_2, \mu_3) = (1; 2; 7)$. Then $(\gamma_1, \gamma_2, \gamma_3) = (-6; -5; 5)$, indicating that $S_3$ has the highest reward and is, in fact, 5 units more profitable than the best (most remunerative) of the other solutions. Similarly, $S_2$ is 5 units less profitable than the best of the other solutions, and $S_1$ is 6 units less profitable than the best of the other solutions. The $\gamma_i$ values are especially useful for identifying near-optimal solutions, which might be easier to implement in practice than the best solution while still incurring high rewards.

In more detail, the outputs of the basic Rinott selection procedure are used to provide a confidence interval $J_i = [a_i, b_i]$ for each $\gamma_i$. With probability C, these intervals are simultaneously correct, in that each interval $J_i$ contains the unknown quantity $\gamma_i$. The intervals provide probabilistic bounds on how suboptimal each system can be. Moreover, with probability C, intervals with $a_i < b_i \leq 0$ correspond to systems that can be eliminated from being considered as the best, and a system with $0 \leq a_i < b_i$ is unambiguously the best. A system with $a_i < 0 < b_i$ is a contender for being the best. This type of procedure goes by the name of "multiple comparisons with the best" (MCB).

FIG. 9 depicts the algorithm implementing the Rinott procedure. In stage 1, which corresponds to steps 2-5, $n_0$ initial replications are run for each system $S_i$. Based on the sample mean $\overline{X_i}$ and sample variance $V_i$ of the reward for $S_i$, the algorithm computes (step 5) the total number of replications $N_i$ of system $S_i$ needed to make a correct selection with the required probability C. The quantity $h = h(n_0, k, C)$ appearing in step 5 is a tabulated constant whose value is based on the assumption that each stage-1 mean $\overline{X_i}$ is normally distributed. In stage 2, additional replications of $S_i$ are run (step 6) to bring the total number of replications to Based on the final estimates $\overline{Y_1}, \overline{Y_2}, \ldots, \overline{Y_k}$ of the expected rewards $\mu_1, \mu_2, \ldots, \mu_k$, one of the $S_i$'s is selected as the best system. In the final step, the algorithm computes confidence intervals for $\gamma_1, \gamma_2, \ldots, \gamma_k$.

Figure 10:
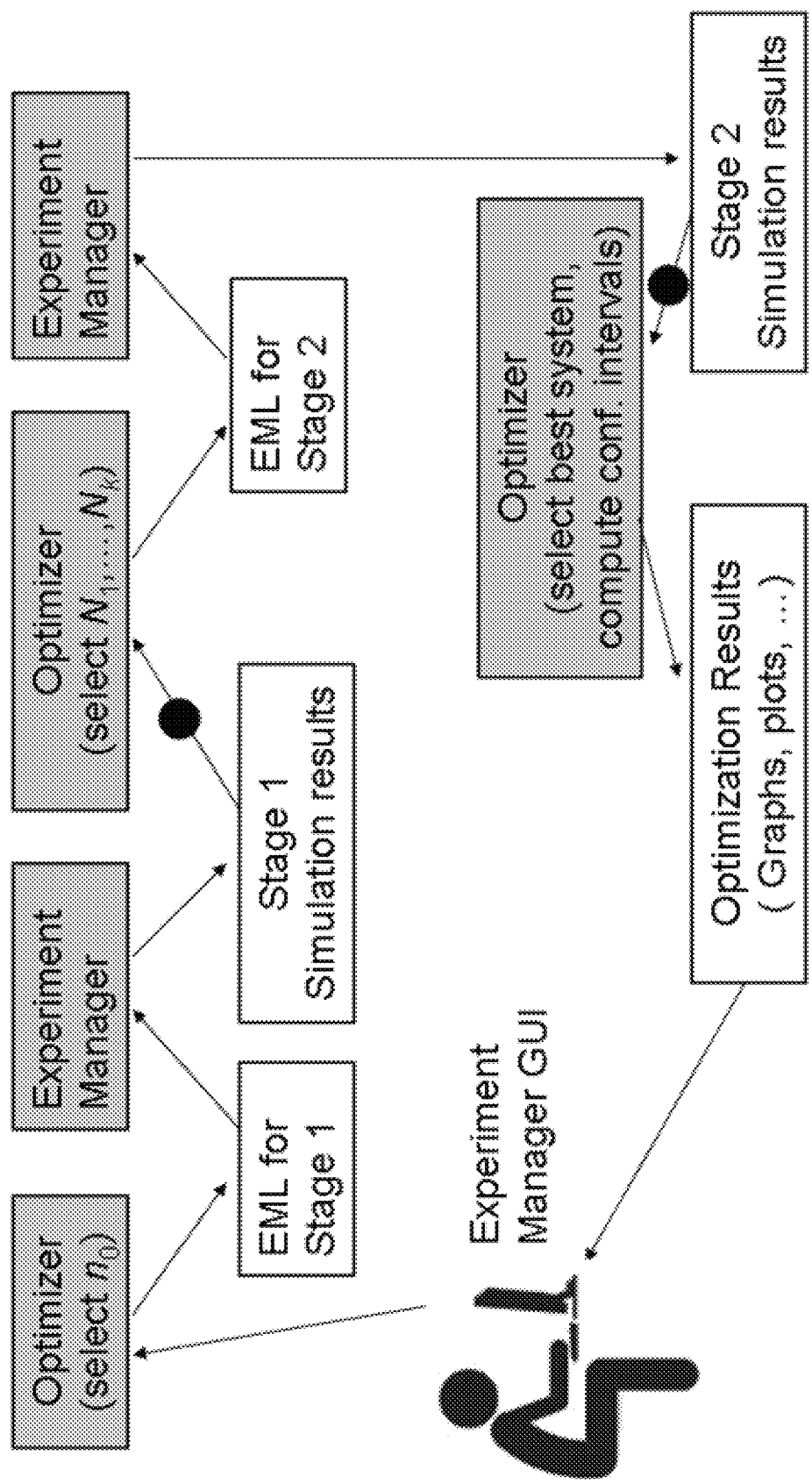
FIG. 10 depicts the algorithm associated with the Rinott selection procedure.

FIG. 10 illustrates how the optimizer component of Splash uses the experiment manager to perform the Rinott procedure. The user, employing the Splash experiment manager GUI, specifies the feasible values of the control variable as a set of conditions, and also specifies the indifference zone $\delta$ and the probability C of correct selection. The optimizer component then determines the number $n_0$ of stage-1 replications and creates an EML file to run the experiments, which is then passed to the experiment manager for execution. The optimizer then processes the output files created by the experiment manager to extract the stage-1 sample mean and variance of the reward for each condition simulated. In general, this extraction step might require the user to provide a routine for computing the reward from the output of a given simulation run; this component is represented in FIG. 9 by a black circle. The optimizer then determines the number of stage-2 replications for each condition and creates an EML file, which is passed to the experiment manager for execution. When the experiment manager completes, the optimizer computes the overall sample means $\overline{Y_1}, \overline{Y_2}, \ldots, \overline{Y_k}$, which serve as the final estimates of the expected system rewards. The optimizer then selects as best the system $S_i$ having the largest $\overline{Y}_i$ value and computes the MCB confidence intervals. Finally, the results are displayed to the user.

IV. Sensitivity Analysis

Because a composite model will typically have many parameters, it is usually essential to determine which of the parameters have the greatest effects on system performance. These sensitive parameters can then be used for optimization purposes as described above. Sensitivity information is important in its own right: Sensitive parameters can become a focal point for policy and investment decisions, and may also drive data-collection efforts, since such parameters must be estimated very carefully.

To illustrate the use of the Splash experiment manager for efficient sensitivity analysis, a simple method is implemented for main-effects assessment as described in the publication to T. T. Allen entitled *Introduction to Discrete Event Simulation and Agent-Based Modeling*, Springer, 2011. Specifically, "high" and "low" values for each of a small set of k factors are specified by the user, based on practical considerations. The sensitivity-analysis component then generates an orthogonal fractional-factorial design using R's FrF2 library. For k=7 factors, one such design is as follows:

| A | B | C | D | E | F | G |
|---|---|---|---|---|---|---|
| −1 | −1 | −1 | 1 | 1 | 1 | −1 |
| 1 | −1 | −1 | −1 | −1 | 1 | 1 |
| −1 | 1 | −1 | −1 | 1 | −1 | 1 |
| 1 | 1 | −1 | 1 | −1 | −1 | −1 |
| −1 | −1 | 1 | 1 | −1 | −1 | 1 |
| 1 | −1 | 1 | −1 | 1 | −1 | −1 |
| −1 | 1 | 1 | −1 | −1 | 1 | −1 |
| 1 | 1 | 1 | 1 | 1 | 1 | 1 |

This design prescribes eight experimental conditions, one per row. Each column corresponds to a factor (here labeled A-G). The symbol "−1" (resp., "1") in the $i^{th}$ row and $j^{th}$ column indicates that the $j^{th}$ factor is to be set to its low (resp., high) value in the $i^{th}$ experiment. The design is orthogonal in that the columns are mutually orthogonal: the inner product of any two columns equals 0. Importantly, each factor is set to its low and high value equally often in the experimental conditions, i.e., a factor is low in four conditions and high in the remaining four conditions. The plan is to run n i.i.d. Monte Carlo replications for each condition and average the results. The goal here is to run enough replications so that the distribution of each average is approximately normal, and so n between 20 and 50 is typically chosen. The design is called fractional factorial since the number of experimental conditions tested is much less than the $2^k$ possible conditions. In this example, there are $2^7=128$ possible conditions, of which only eight are run. With n=20 Monte Carlo replications, this represents a reduction from 2,560 to 160 total simulation runs of the composite model.

Based on the foregoing specification, Splash synthesizes an EML file embodying the above experiment, and sends it to the experiment manager for execution. After the experiments have been run, the results can be displayed in a main-effects plot. For each factor, the plot displays the average system response over the four conditions in which the factor is low and over the four conditions in which it is high—the effect size for a factor is the difference between these averages. The resulting plot indicates both the direction of the response (increasing or decreasing) as the factor value increases, as well as the relative magnitude of the responses. To determine the statistical significance of the effects, the effect sizes can be displayed in a normal probability plot (sometimes called a Daniel plot). The k effect sizes are plotted, in increasing order, against the 1/k quantiles of the standard normal distribution. If there were no factor effects, then the observations would fall roughly on a straight line; deviations from such a line indicate significant effects. Splash uses the MEPlot and DanielPlot functions in R's DOE.base package to create main-effects and Daniel plots.

V. Case Study

To demonstrate how the experiment manager can provide Splash with both optimization and sensitivity-analysis functionality, the composite FR-PHI model described earlier was experimented with. The model estimates a number of economic metrics associated with the wellness program; with the focus being on the profit to PHI, the wellness provider. A key control variable is the payment-model parameter $\alpha$. A value of 0 corresponds to a pure capitation system where PHI receives a fixed dollar amount per program participant per year; a value of 1 corresponds to a pure pay-for-outcome system in which PHI is paid according to the (estimated) illness-related costs that are avoided for each participant due to PHI health interventions. A value between 0 and 1 corresponds to a combination of these payment methods. To make the model a bit more interesting from an optimization point of view for purposes of this demonstration, the model was slightly modified so that, as $\alpha$ increases and PHI revenue becomes increasingly linked to patient health outcomes, the healthcare providers spend increasing amounts of time and resources on each program participant during office visits, examinations, and so on, increasing healthcare delivery costs which counterbalance revenue increases due to improved health outcomes.

Figure 11:
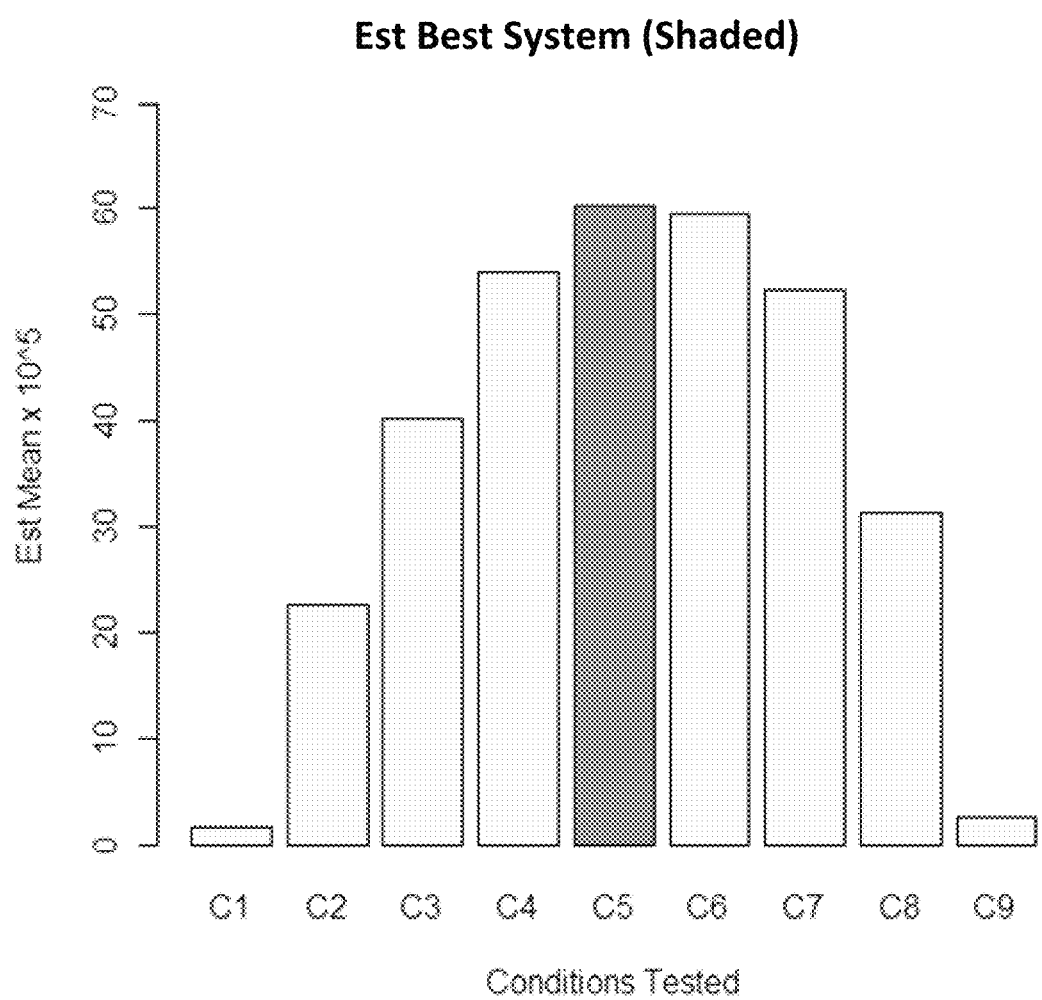
FIG. 11 and FIG. 12 depict Rinott optimization procedures outputs.
Figure 12:
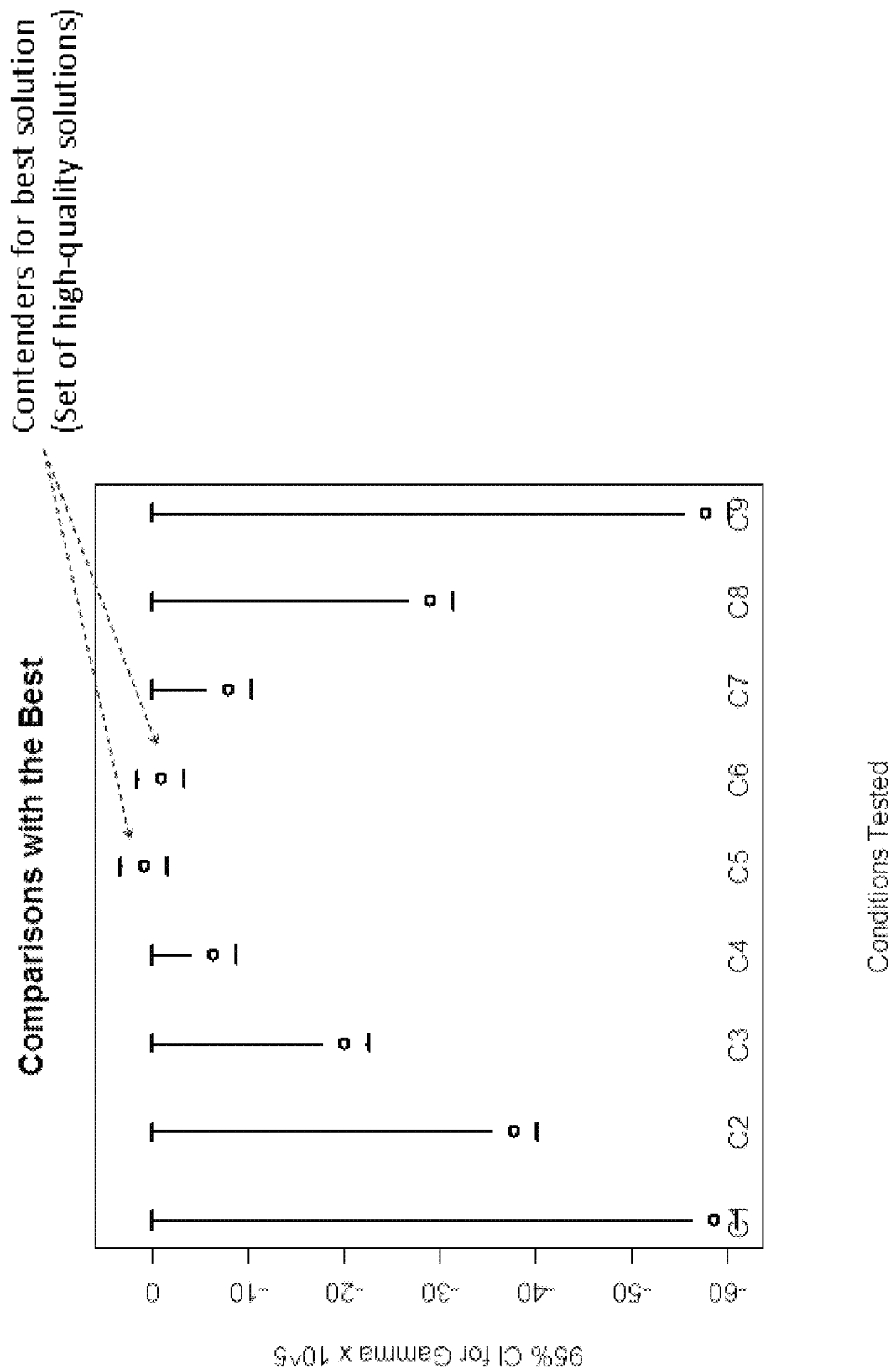

FIG. 11 and FIG. 12 show the output from the Rinott optimization procedure. Conditions C1-C9 correspond to $\alpha$ values of 0.1, 0.2, . . . , 0.9. As can be seen in FIG. 9, condition C5 (which corresponds to setting $\alpha=0.5$) is selected as best; under an indifference zone value of $\delta=\$250$; 000, this decision is correct with probability 95%. FIG. 10 shows the corresponding MCB plot. As can be seen, values of $\alpha$ less than 0.5 or greater than 0.6 can be rejected as suboptimal with 95% confidence. At this level of confidence, there is no value that is unambiguously superior; the two values of $\alpha=0.5$ and $\alpha=0.6$ are both contenders to be the true optimal value. The confidence intervals show that neither solution yields a profit far from the true optimal profit, so both solutions are quite acceptable.

Figure 13:
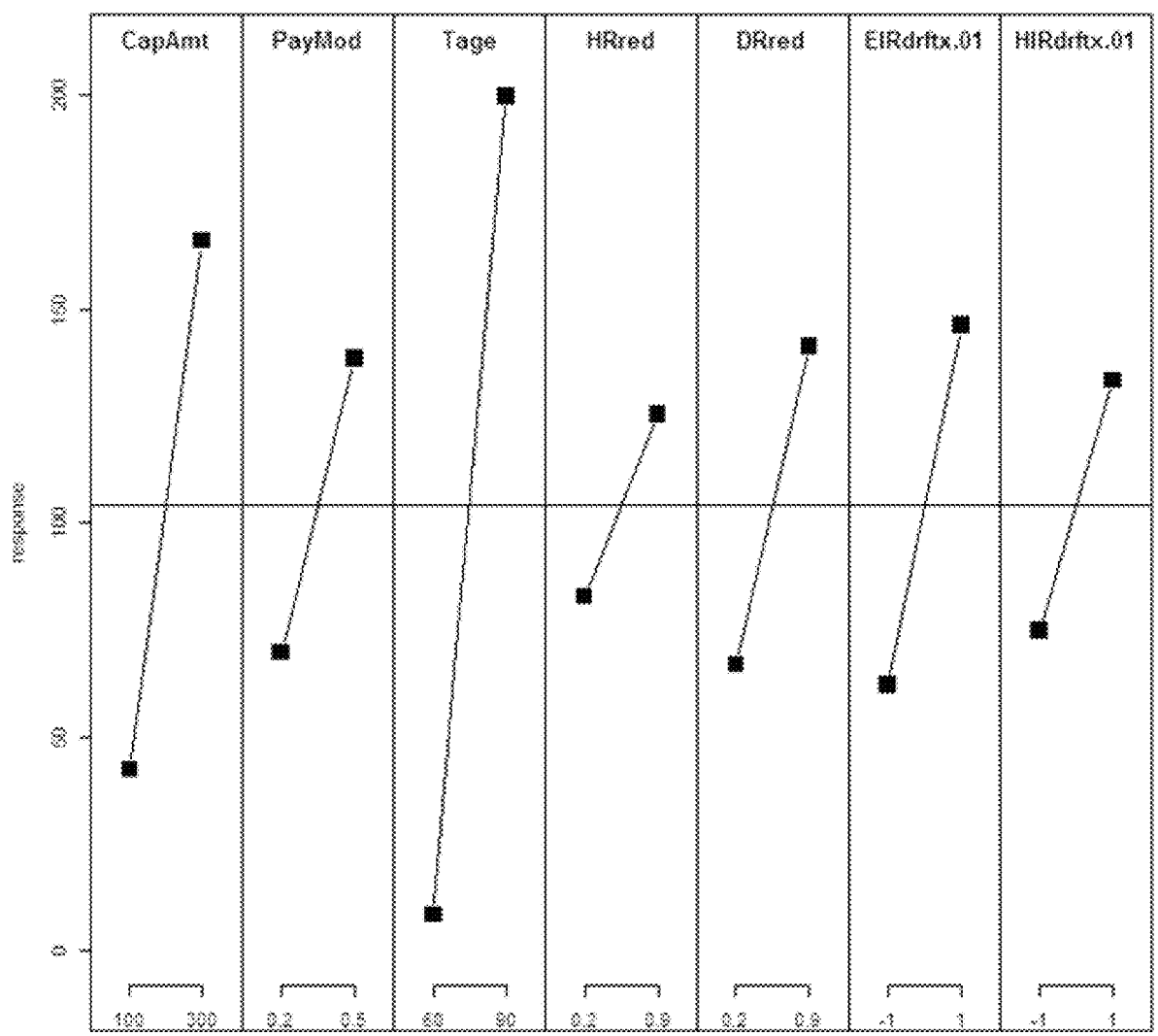
FIG. 13 and FIG. 14 depict sensitivity analysis outputs.
Figure 14:
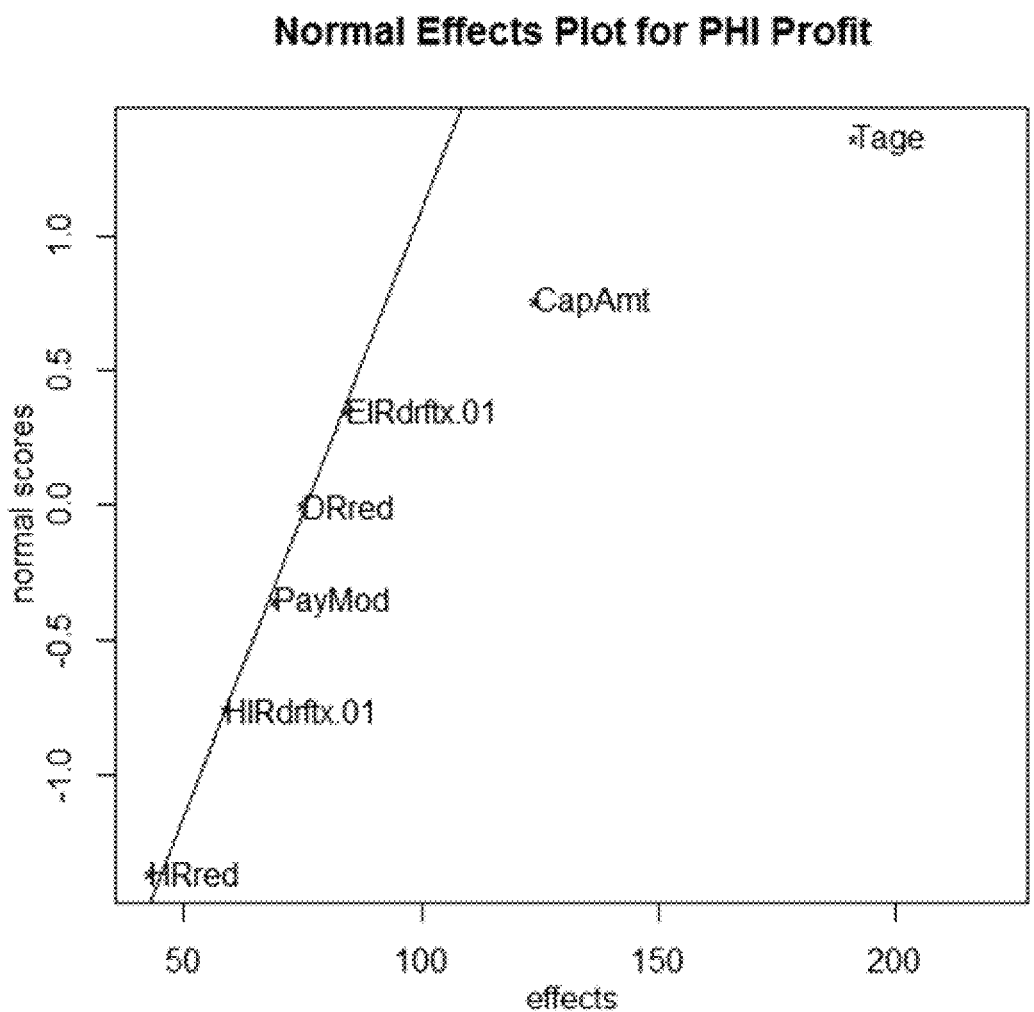

FIG. 13 and FIG. 14 show the output from the sensitivity analysis. The parameters studied are the capitation amount, payment model parameter ($\alpha$), terminal age at which participants leave the program, yearly heart-risk and diabetes-risk reductions due to PHI interventions, and the mean drift in the rates of economic inflation and healthcare-cost inflation. FIG. 11 shows that the PHI profit is monotonically increasing in each of these parameters. Perhaps surprisingly, the most sensitive variable is the terminal age followed (probably not surprisingly) by the capitation amount. The Daniel plot in FIG. 12 indicates that these two effects are the only statistically significant effects of those considered (based on the experiments conducted).

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor. By way of example, and not limitation, such non-transitory computer-readable media can include flash memory, RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. The computer readable media does not include carrier waves and electronic signals passing wirelessly or over wired connections.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable BluRay® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As noted above, particular embodiments of the subject matter have been described, but other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

CONCLUSION

A system and method has been shown in the above embodiments for the effective implementation, design and execution of numerical experiments on a composite simulation model. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program, computing environment, or specific computing hardware.

The invention claimed is:

1. A non-transitory, computer accessible memory medium storing program instructions for specifying and executing numerical experiments on a composite simulation model, wherein the program instructions are executable by a processor to implement:
  a first interface for independently eliciting, from each of a set of contributors of component models, information comprising:
    a recommended set of model parameters to use as experimental factors and optional recommended levels for each recommended experimental factor, all of which incorporate each contributor's expertise,
    at least one component model within said component models includes a pseudo-random number generator, a specification for said at least one component model's pseudo-random number generator comprising a pseudo-random number generator name, and
    component model information regarding the recommended set of model parameters, the optional recommended levels, and the pseudo-random number generator name are all stored in a model repository;
  a second interface that combines, based on the component model information stored in the model repository, the individual recommendations for a plurality of component models into a coherent global recommendation for a dynamically created composite model comprising the plurality of component models;
  a third interface for outputting the dynamically created composite model, and
  wherein the processor executes the program instructions to perform a simulation by running the dynamically created composite model comprising a plurality of component models under a range of different inputs and parameter values to study a behavior of the dynamically created composite model and calibrating and optimizing a complex system over a plurality of such runs, wherein running the dynamically created composite model comprises:
  receiving, for each component model, a set of parameter values;
  synthesizing a file that includes parameter values for each component model by converting the set of parameter values for each component model into a symbolic representation that represents a parameter and data value assigned to the parameter;
  storing the file at a predetermined location for each component model; and
  generating a plurality of seed values one each for the pseudo random number generator of each component model respectively, wherein a first seed value for a first component model is generated using a global seed value and a present state of the pseudo random number generator of the first component model.

2. The non-transitory, computer accessible memory medium of claim 1, wherein said medium further comprises program instructions that are executed by said processor to implement:
  a fourth interface for designing a numerical experiment by using said global recommendation to specify a set of experimental conditions for the dynamically created composite model, along with a number of Monte Carlo replications to use for each experimental condition.

3. The non-transitory, computer accessible memory medium of claim 2, wherein said processor executes said numerical experiment said one or more times to debug said dynamically created composite model.

4. The non-transitory, computer accessible memory medium of claim 2, wherein said processor executes said numerical experiment said one or more times as production runs wherein said dynamically created composite model is executed under a range of different inputs and parameter values.

5. The non-transitory, computer accessible memory medium of claim 1, wherein said information is input as metadata.

6. The non-transitory, computer accessible memory medium of claim 5, wherein said metadata is input via at least one metadata file written in Splash Actor Description Language (SADL).

7. A non-transitory, computer accessible memory medium storing program instructions for specifying and executing numerical experiments on a composite simulation model, wherein the program instructions are executable by a processor to implement:
  a first interface for independently eliciting, from each of a set of contributors of component models, information comprising:
    a recommended set of model parameters to use as experimental factors and optional recommended levels for each recommended experimental factor, all of which incorporate each contributor's expertise,
    at least one component model within said component models includes a pseudo-random number generator, a specification for said at least one component model's pseudo-random number generator comprising a pseudo-random number generator name, and
    component model information regarding the recommended set of model parameters, the optional recommended levels, and the pseudo-random number generator name are all stored in a model repository;
  a second interface that combines, based on the component model information in the model repository, the individual recommendations for a plurality of component models into a coherent global recommendation for a dynamically created composite model comprising the one or more component models;
  a third interface for designing a numerical experiment by using said global recommendation to specify a set of experimental conditions for the dynamically created composite model, along with a number of Monte Carlo replications to use for each experimental condition;
  an execution component that executes said numerical experiment by running said dynamically created composite model one or more times, wherein such running includes the steps of routing appropriate parameter values to each component model and assigning seeds to random number generators in each composite model to avoid unintended statistical dependencies between component models, wherein running the dynamically created composite model comprises:
  receiving, for each component model, a set of parameter values;
  synthesizing a file that includes parameter values for each component model by converting the set of parameter values for each component model into a symbolic representation that represents a parameter and data value assigned to the parameter;
  storing the file at a predetermined location for each component model; and generating a plurality of seed values one each for the pseudo random number generator of each component model respectively, wherein a first seed value for a first component model is generated using a global seed value and a present state of the pseudo random number generator of the first component model;

a fourth interface for outputting an output of the execution component; and a sensitivity-analysis component optimizing a complex system based on the output of the execution component and one or more sensitive parameters.

8. The non-transitory, computer accessible memory medium of claim 7, wherein said execution component executes said numerical experiment said one or more times to debug said dynamically created composite model.

9. The non-transitory, computer accessible memory medium of claim 8, wherein said execution component executes said numerical experiment said one or more times as production runs wherein said composite model is executed under a range of different inputs and parameter values to study said dynamically created composite model's behavior.

10. The non-transitory, computer accessible memory medium of claim 7, wherein said information is input as metadata.

11. The non-transitory, computer accessible memory medium of claim 10, wherein the said metadata are input via at least one metadata file writing in Splash Actor Description Language (SADL).

12. A system comprising:
a processor;
a storage storing program instructions for specifying and executing numerical experiments on a composite simulation model, wherein the program instructions are executable by said processor to implement:
a first interface for independently eliciting, from each of a set of contributors of component models, information comprising:
a recommended set of model parameters to use as experimental factors and optional recommended levels for each recommended experimental factor, all of which incorporate each contributor's expertise,
at least one component model within said component models includes a pseudo-random number generator, a specification for said at least one component model's pseudo-random number generator comprising a pseudo-random number generator name, and
component model information regarding the recommended set of model parameters, the optional recommended levels, and the pseudo-random number generator name are all stored in a model repository;
a second interface that combines, based on the component model information stored in the component model repository, the individual recommendations for a plurality of component models into a coherent global recommendation for a dynamically created composite model comprising the plurality of component models; and
a third interface for outputting said dynamically created composite model, and
wherein the processor executes the program instructions to perform a simulation by running the dynamically created composite model comprising a plurality of component models under a range of different inputs and parameter values to study a behavior of the dynamically created composite model and calibrating and optimizing a complex system over a plurality of such runs, wherein running the dynamically created composite model comprises:
receiving, for each component model, a set of parameter values;
synthesizing a file that includes parameter values for each component model by converting the set of parameter values for each component model into a symbolic representation that represents a parameter and data value assigned to the parameter;
storing the file at a predetermined location for each component model; and
generating a plurality of seed values one each for the pseudo random number generator of each component model respectively, wherein a first seed value for a first component model is generated using a global seed value and a present state of the pseudo random number generator of the first component model.

13. The system of claim 12, wherein storage further stores program instructions that are executed by said processor to implement:
a fourth interface for designing a numerical experiment by using said global recommendation to specify a set of experimental conditions for the dynamically created composite model, along with a number of Monte Carlo replications to use for each experimental condition.

14. The system of claim 13, wherein said processor executes said numerical experiment said one or more times to debug said dynamically created composite model.

15. The system of claim 13, wherein said processor executes said numerical experiment said one or more times as production runs wherein said composite model is executed under a range of different inputs and parameter values to study said dynamically created composite model's behavior.

16. The system of claim 12, wherein said information is input as metadata.

17. The system of claim 16, wherein said metadata is input via at least one metadata file written in Splash Actor Description Language (SADL).

18. A computer-based method for specifying and executing numerical experiments on a composite simulation model comprising:
independently eliciting, from each of a set of contributors of component models, information comprising:
a recommended set of model parameters to use as experimental factors and optional recommended levels for each recommended experimental factor, all of which incorporate each contributor's expertise,
at least one component model within said component models includes a pseudo-random number generator, a specification for said at least one component model's pseudo-random number generator comprising a pseudo-random number generator name, and
component model information regarding the recommended set of model parameters, the optional recommended levels, and the pseudo-random number generator name are all stored in a model repository;
combining, based on the component model information in the model repository, the individual recommendations for a plurality of component models into a coherent global recommendation for a dynamically created composite model comprising the plurality of component models; and dynamically running the created composite model under a range of different inputs and parameter values to study its behavior and calibrating and optimizing a complex system over a plurality of such runs, wherein running the dynamically created composite model comprises:

receiving, for each component model, a set of parameter values;

synthesizing a file that includes parameter values for each component model by converting the set of parameter values for each component model into a symbolic representation that represents a parameter and data value assigned to the parameter;

storing the file at a predetermined location for each component model; and generating a plurality of seed values one each for the pseudo random number generator of each component model respectively, wherein a first seed value for a first component model is generated using a global seed value and a present state of the pseudo random number generator of the first component model.

19. The computer-based method of claim 18, further comprising:

designing a numerical experiment by using said global recommendation to specify a set of experimental conditions for the dynamically created composite model, along with a number of Monte Carlo replications to use for each experimental condition.

20. The computer-based method of claim 19, wherein said numerical experiment is executed said one or more times as production runs wherein said composite model is executed under a range of different inputs and parameter values to study said dynamically created composite model's behavior.

* * * * *